(12) United States Patent
Sherwani

(10) Patent No.: US 7,870,496 B1
(45) Date of Patent: Jan. 11, 2011

(54) SYSTEM USING TOUCHSCREEN USER INTERFACE OF A MOBILE DEVICE TO REMOTELY CONTROL A HOST COMPUTER

(76) Inventor: Jahanzeb Ahmed Sherwani, 509 Sierra Vista Ave., No. 6, Mountain View, CA (US) 94043

( * ) Notice: Subject to any disclaimer, the term of this patent is extended or adjusted under 35 U.S.C. 154(b) by 162 days.

(21) Appl. No.: 12/362,248

(22) Filed: Jan. 29, 2009

(51) Int. Cl.
G06F 3/00 (2006.01)

(52) U.S. Cl. ............... 715/761; 715/740; 715/737; 715/718

(58) Field of Classification Search .......... 715/761, 715/740, 737, 718, 249; 709/223, 248; 382/306
See application file for complete search history.

(56) References Cited

U.S. PATENT DOCUMENTS

| | | | |
|---|---|---|---|
| 5,906,657 A * | 5/1999 | Tognazzini | 709/248 |
| 6,225,984 B1 | 5/2001 | Crawford | |
| 6,324,544 B1 | 11/2001 | Alam et al. | |
| 6,622,018 B1 | 9/2003 | Erekson | |
| 6,750,803 B2 | 6/2004 | Yates et al. | |
| 6,765,557 B1 | 7/2004 | Segal et al. | |
| 6,954,355 B2 | 10/2005 | Gerstner et al. | |
| 7,085,542 B2 | 8/2006 | Dietrich et al. | |
| 7,180,502 B2 | 2/2007 | Marvit et al. | |
| 7,321,785 B2 | 1/2008 | Harris | |
| 2003/0054794 A1 | 3/2003 | Zhang | |
| 2005/0047683 A1* | 3/2005 | Pollard et al. | 382/306 |
| 2005/0080909 A1 | 4/2005 | Panasyuk et al. | |
| 2006/0026521 A1 | 2/2006 | Hotelling et al. | |
| 2006/0085534 A1* | 4/2006 | Ralston et al. | 709/223 |
| 2006/0097991 A1 | 5/2006 | Hotelling et al. | |
| 2006/0119585 A1 | 6/2006 | Skinner | |
| 2006/0229067 A1 | 10/2006 | Heisier et al. | |
| 2007/0005607 A1 | 1/2007 | Fukuta et al. | |
| 2007/0177803 A1 | 8/2007 | Elias et al. | |
| 2008/0005057 A1 | 1/2008 | Ozzie et al. | |
| 2008/0036743 A1 | 2/2008 | Westerman et al. | |
| 2008/0062139 A1 | 3/2008 | Hotelling et al. | |
| 2008/0088602 A1 | 4/2008 | Hotelling | |
| 2008/0120448 A1 | 5/2008 | Shi et al. | |

(Continued)

OTHER PUBLICATIONS

Anonymous, "Vnsea," Google Code, Retrieved from internet URL: http://code.google.com/p/vnsea/, retrieved Feb. 2, 2009, available Dec. 15, 2007.

(Continued)

Primary Examiner—Le Luu
(74) Attorney, Agent, or Firm—Baker Botts L.L.P.

(57) ABSTRACT

Various embodiments relate to a local computing device that includes a display and a touchscreen interface. The device is operable to establish a remote network computing session with a host computer system, transmit touch event information associated with touch events, receive graphical display information corresponding to a host image associated with the host computer system, translate the graphical display information from host coordinates to local coordinates, update the local image based on the graphical display information, the local image comprising a selected portion of the host image, and, in response to mouse movement events caused by associated touch events, change the selected portion of the host image while keeping a cursor in the center of the display, except when the center of the selected portion is within a predetermined limit of an edge of the host image, thereafter move the cursor relative to the local display.

24 Claims, 18 Drawing Sheets

U.S. PATENT DOCUMENTS

2008/0165140 A1 7/2008 Christie et al.
2008/0165141 A1 7/2008 Christie
2009/0119580 A1* 5/2009 Rohrabaugh et al. ........ 715/249

OTHER PUBLICATIONS

Rob Miller et al, "Remote Commander for Windows CE/Pocket PC," The Pittsburgh Pebbles PDA Project, retrieved from internet URL: http://www.cs.cmu.edu/~pebbles/v5/remotcmd/windowsce/index.html, retreived Feb. 2, 2009.

Htet Htet Aung, "Pebbles Project Overview," The Pittsburgh Pebbles PDA Project, retrieved from URL: http://www.pebbles/hcii.cmu.edu/, retreived Feb. 2, 2009, 2005.

Htet Htet Aung, "Remote Commander for the Windows CE/ Pocket PC," The Pittsburgh Pebbles PDA Project, retrieved from URL: http://www.pebbles.hcii.cmu.edu/software/remotecmd/pocketpcguide.php, retreived Jan. 6, 2009, 2005.

Anonymous, "LogMeIn Ignition for iPhone and iPod touch User Guide," retrieved from URL: https://secure.logmein.com/documentation/ignition/Ignition_UserGuide_iphone.pdf, 2008.

Anonymous, "Salling Clicker for Windows," Salling Software, retrieved from URL: http://www.salling.com/Clicker/windows/, retreived Dec. 22, 2008, 2008.

Anonymous, "Salling Clicker for Mac 3.5," Salling Software, retrieved from URL: http://www.salling.com/Clicker/mac/, retreived Dec. 22, 2008, 2008.

Anonymous, "Remote Buddy AJ," Remote Buddy, retrieved from URL: http://www.iospirit.com/index.php?mode=view&obj_type=infogroup&obj_id=24&o_infogroup_objcode=infogroup-23&ol_infogroup_objcode=html-141&sid=9076298G8353686aae5f41c1, retrieved Dec. 22, 2008, 2008.

Anonymous, "Chicken of the VNC," Wikipedia, retrieved from URL: http://en.wikipedia.org/wiki/Chicken_of_the_VNC, retrieved Dec. 22, 2008, Nov. 1, 2008.

mtvoid.com, "ControlFreak," My Symbian.com, retrieved from URL: http://my-symbian.com/s60/software/applications.php?fidAuto=928&faq=4, retrieved Dec. 22, 2008, 2001.

Anonymous, Remote PC Access Software, Bomgar, retrieved from URL: http://www.bomgar.com/freetiral.htm?gclid=COXJxr2d1ZcCFOZIswodx2T8DQ, retieved Dec. 22, 2008, May 7, 2007.

Mtvoid.com, "Control Freak," mtvoid, retrieved from URL: http://mtvoid.com/screenshots.html, retrieved Dec. 22, 2008, 2007.

Mtvoid.com, "Control Freak," mtvoid, retrieved from URL: http://mtvoid.com/overview.html, retrieved Dec. 22, 2008, 2007.

Anonymous, "T*elekinesis*," Google Code, retrieved from internet URL: http://code.google.com/p/telekinesis/, pp. 1-3, retrieved Dec. 22, 2008, 2008.

* cited by examiner

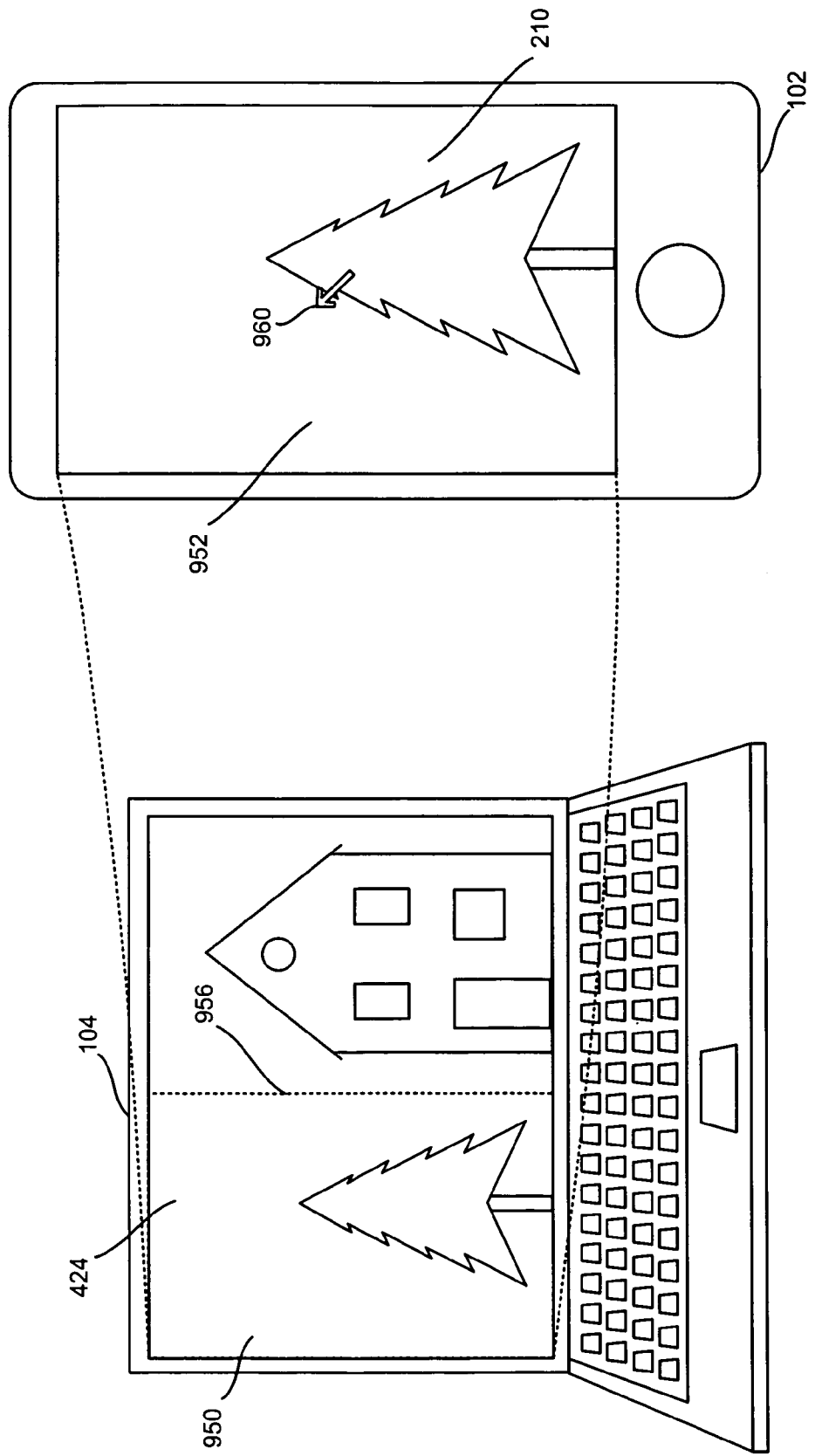

SYSTEM USING TOUCHSCREEN USER INTERFACE OF A MOBILE DEVICE TO REMOTELY CONTROL A HOST COMPUTER

TECHNICAL FIELD

The present disclosure relates generally to remote network computing and, more particularly, to the use of a handheld computing device having a touchscreen display interface, such as a mobile phone or multimedia device, to control operations of a host computer which may reside in a remote location.

BACKGROUND

Remote network computing generally relates to the sharing of a graphical display on a host computer, which may be in a remote location, with a local computing device in order to facilitate the control of the remote host computer via the local computing device. More particularly, a user of the local computing device is able to view, via the graphical user interface of the local computing device, all or a portion of the graphical user interface on the remote host computer and, furthermore, control the operations of the remote host computer via inputs to the local computing device.

A remote network computing system generally includes a client, a server and a communication protocol. The server is the program on the machine that shares its screen (i.e., at the host computer). The client (or viewer) is the program that watches and interacts with the server (i.e., at the local computing device). Finally, the communication protocol is generally based on graphical elements sent from server to client in one direction, and event messages from client to server in the opposite direction. By way of example, the server may send the client pixel data to be displayed at a specified position, and the client may send the server events related to inputs at the client.

BRIEF DESCRIPTION OF THE DRAWINGS

The present disclosure is illustrated by way of example, and not by way of limitation, in the figures of the accompanying drawings and in which like reference numerals refer to similar elements and in which:

FIGS. 9A-9D shows a local computing device display and host computer system display after a remote network computing session has been established between the local computing device and host computer system in accordance with an embodiment of the present disclosure.

DESCRIPTION OF EXAMPLE EMBODIMENTS

The present disclosure is now described in detail with reference to a few preferred embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order to not unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Particular example embodiments relate to the use of a handheld computing device having a touchscreen display interface, such as a mobile phone or multimedia device, to control operations of a host computer which may reside in a remote location.

Figure 1:
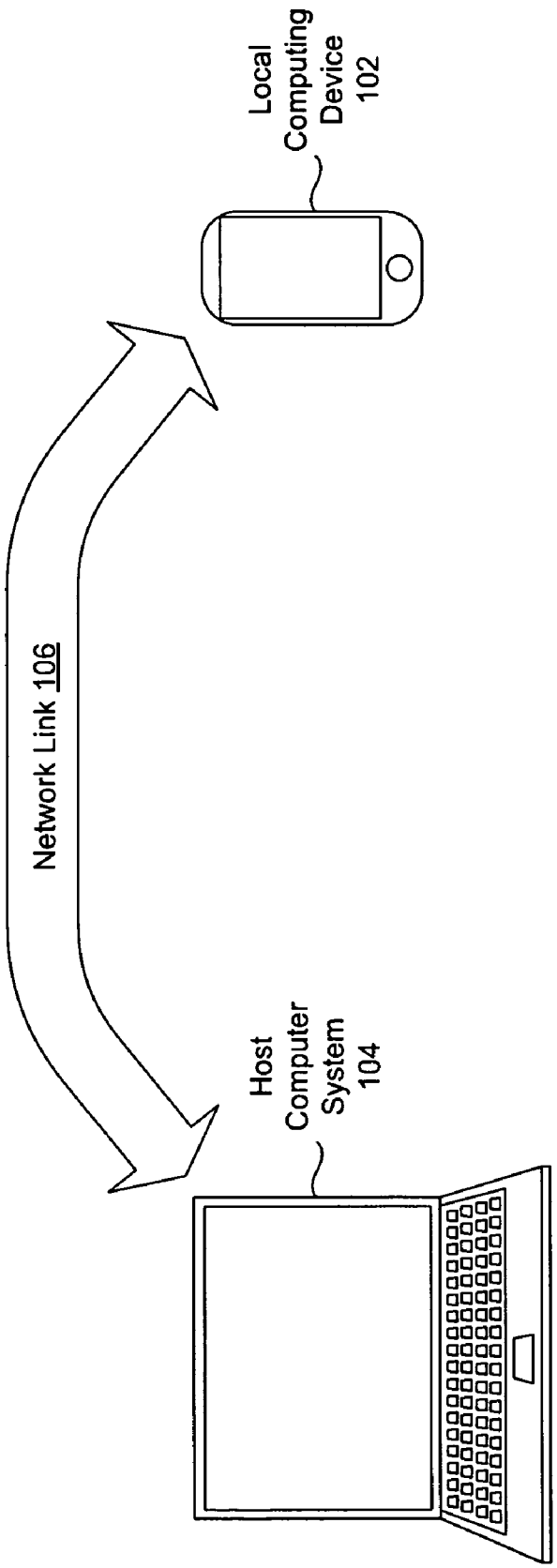
FIG. 1 illustrates a block diagram of an example computer network environment in accordance with an embodiment of the present disclosure.

FIG. 1 illustrates a block diagram of a computer network environment 100 in accordance with an example embodiment. Computer network environment 100 includes a local computing device 102, a host computer system 104, and a network link 106 by which the local computing device 102 and host computer 104 are able to communicate. Generally, local computing device 102 may be any suitable computer system capable of establishing a remote network computing session with host computer system 104 via network link 106, and vice versa.

Remote Network Computing (hereinafter RNC) generally relates to the sharing of a graphical display on a host computer, which may be in a remote location, with a local computing device in order to facilitate the control of the remote host computer via the local computing device. More particularly, a user of the local computing device is able to view, via the graphical user interface of the local computing device, all or a portion of the graphical user interface on the remote host computer and, furthermore, control the operations of the remote host computer via inputs to the local computing device.

An RNC system generally includes a client, a server, and a suitable communication protocol. The RNC server is the program (e.g., software and/or firmware) on the machine that shares its screen (i.e., at the host computer). The RNC client (or viewer) is the program (e.g., software and/or firmware) that watches and interacts with the server (i.e., at the local computing device). Finally, the RNC communication protocol is a communication protocol based on graphical elements sent from server to client in one direction, and event messages from client to server in the opposite direction. By way of example, the server may send the client pixel data to be displayed at a specified position, and the client may send the server events related to inputs at the client.

Conventional RNC protocols include the Remote Framebuffer Protocol (RFB) and the Remote Desktop Protocol (RDP). The RFB protocol is typically associated with Virtual Network Computing (VNC), a conventional branch of RNC. Specific versions of RFB and/or RDP exist for most versions of Windows (including handheld versions), Linux/Unix, Mac OS X and other modern operating systems. In various embodiments, local computing device 102 and host computer system 104 are configured to communicate over network link 106 via RFB or RDP. Other conventional RNC protocols include ICA (Independent Computing Architecture), X11 (based on the X display protocol), NX (related to the X11 protocol), and AIP (Adaptive Internet Protocol), among others.

Various embodiments enable a user of local computing device 102 to control the operation of host computer system 104 via an RNC session established between local computing device 102 and host computer system 104 over network link 106. More particularly, various embodiments enable a user of local computing device 102 to use any PC application (e.g., Word, PowerPoint, Outlook, Excel, Internet Explorer, Firefox) on host computer system 104 remotely if host computer system 104 is PC compatible, or any Mac or Apple application if host computer system 104 is Mac or Apple compatible. By way of example, a user of local computing device 102 can use local computing device 102 to advance slides in a presentation, control a media center, check e-mail, etc. Local computing device 102 may effectively serve as a remote display, wireless touchpad, keyboard and media remote. In some embodiments, local computing device 102 may even be configured to stream audio from host computer system 104.

Figure 2:
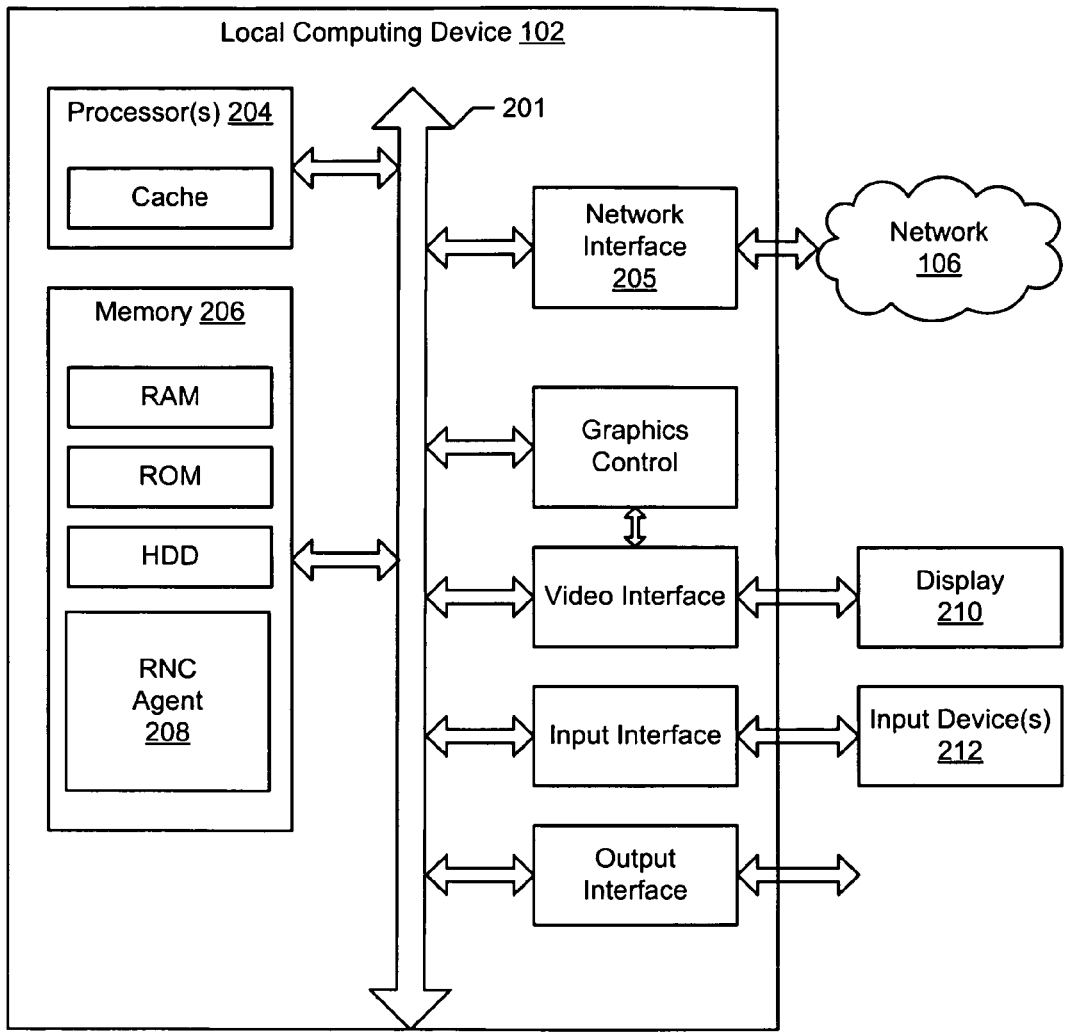
FIG. 2 illustrates a block diagram of an example computing device in accordance with an embodiment of the present disclosure.
Figure 3:
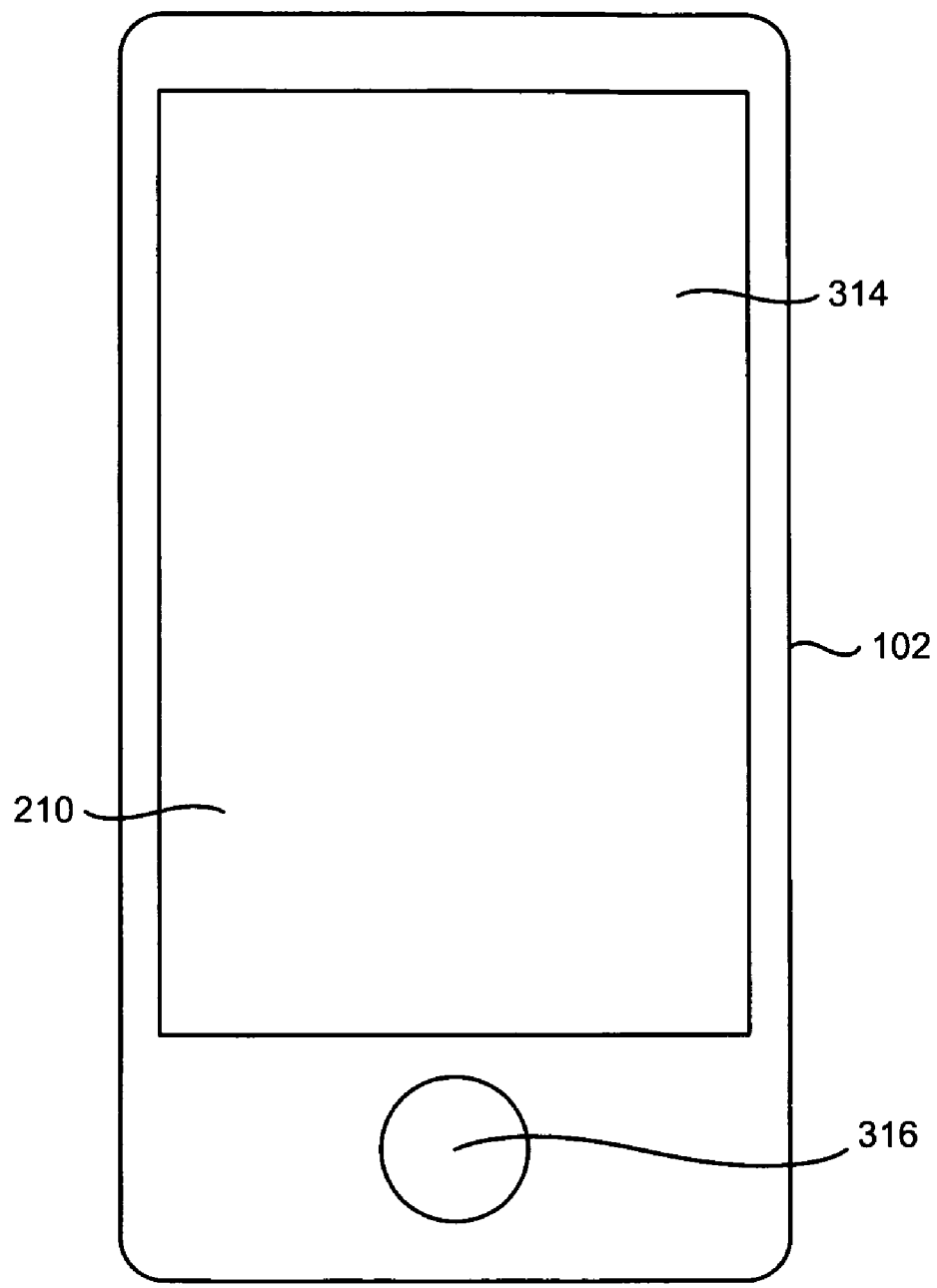
FIG. 3 illustrates a diagrammatic top view of an example computing device in accordance with an embodiment of the present disclosure.

FIG. 2 illustrates a block diagram of an example computing device suitable for use as local computing device 102. Local computing device 102 may take a variety of forms. In a particular embodiment, local computing device 102 takes the form of a handheld computing device. In an even more particular embodiment, local computing device 102 takes the form of a cellular phone, and even more particularly a "smartphone," or multimedia device having a touchscreen display interface. By way of example, some particular embodiments may be implemented on the iPod Touch, iPhone and/or iPhone 3G manufactured by Apple Inc. of Cupertino, Calif. FIG. 3 illustrates a particular example embodiment of a cellular phone or multimedia device 102 having a touchscreen interface 314. In alternate embodiments, the computing device 102 may take the form of a personal digital assistant (PDA), desktop computer, laptop computer, tablet computer, or other handled computing device having suitable processing and other capabilities.

Computing device 102 generally includes one or more processors 204 (also referred to as central processing units, or CPUs and hereinafter referred to as processor 204) configured to execute instructions and to carry out operations associated with the computing device 102. Processor 204 may optionally contain a cache memory unit for temporary local storage of instructions, data, or computer addresses. By way of example, using instructions retrieved from memory, the processor 204 may control the reception and manipulation of input and output data between components of the computing device 102. In various embodiments, the processor 204 can be implemented as a single-chip, multiple chips and/or other electrical components including one or more integrated circuits and printed circuit boards.

The processor 204 together with a suitable operating system may operate to execute instructions in the form of computer code and produce and use data. By way of example and not by way of limitation, the operating system may be Windows-based, Mac-based, or Unix or Linux-based, among other suitable operating systems. Operating systems are generally well known and will not be described in further detail here. The operating system, other computer code (including RNC client 208 described below) and/or data may be physically stored within a memory block 206 that is operatively coupled to the processor 204.

Memory block 206 encompasses one or more storage mediums and generally provides a place to store computer code (e.g., software and/or firmware) and data that are used by the computing device 102. By way of example, the memory block 206 may include various tangible computer-readable media including Read-Only Memory (ROM) and/or Random-Access Memory (RAM). As is well known in the art, ROM acts to transfer data and instructions uni-directionally to the processor 204, and RAM is used typically to transfer data and instructions in a bi-directional manner. Memory block 206 may also include one or more fixed storage devices in the form of, by way of example, magnetic or solid-state hard disk drives (HDDs), among other suitable forms of memory coupled bi-directionally to the processor 204. Information may also reside on a removable storage medium loaded into or installed in the computing device 102 when needed. By way of example, any of a number of suitable memory cards may be loaded into the computing device 102 on a temporary or permanent basis.

Processor 204 is also generally coupled to a variety of interfaces such as graphics control, video interface, input interface, output interface, storage interface, and these interfaces in turn are coupled to the appropriate devices. Processor 204 is also coupled to a network interface 205 that allows local computing device 102, and particularly processor 204, to be coupled to another computer or telecommunications network (e.g., network link 106). More particularly, the network interface 205 generally allows processor 204 to receive information from the network 106, or might output information to the network in the course of performing various method steps described below. Communications may be sent to and from local computing device 102 via network interface 205. By way of example, incoming communications, such as a request or a response from another device (e.g., host computer system 104), in the form of one or more packets, may be received from network 106 at network interface 205 and stored in selected sections in memory block 206 for processing. Outgoing communications, such as a request or a response to another device (e.g., host computer system 104), again in the form of one or more packets, may also be stored in selected sections in memory 206 and sent out to network 106 at network interface 205. Processor 204 may access these communication packets stored in memory 206 for processing.

Local computing device 102 also includes an RNC client 208 that can serve as an RNC client for establishing RNC sessions with other networked computing devices such as host computer system 104 via network interface 205. RNC client 208 may generally be implemented as one or more software programs or applications stored in memory 206. RNC client 208 may be configured to utilize any suitable RNC communication protocol such as, by way of example, RDP described above.

Computing device 102 also includes a display device 210 that is operatively coupled to the processor 204. The display device 210 may include any suitable display screen technology. By way of example, in a particular embodiment, the display device 210 includes a liquid crystal display (LCD). Display device 210 is generally configured to display a graphical user interface (GUI) that provides an easy to use visual interface between a user of the computing device 102 and the operating system or application(s) running on the computing device. Generally, the GUI presents programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user of the computing device 102. During operation, the user can select and activate various graphical images displayed on the display 210 in order to initiate functions and tasks associated therewith.

Local computing device 102 also includes one or more user input devices 212 that are operatively coupled to the processor 204. Generally, input devices 212 are configured to transfer data, commands and responses from the outside world into the computing device 102. By way of example, the input devices 212 may be used to move a cursor, navigate menus and to make selections with respect to the GUI on the display device 210. The input devices 212 may also be used to perform other operations including paging, scrolling, panning and zooming, among others. Generally, input devices may be used to respond to prompts and to issue commands in the computing device 102.

Conventional input devices include buttons or keys, mice, trackballs, touchpads, joysticks and touchscreens, among others. In one particular embodiment, the input devices 212 include at least one touchscreen interface 314 and at least one button input 316, as shown in the embodiment illustrated in FIG. 3. In some alternate embodiments, computing device 102 may include other varieties of input devices other than or in addition to touchscreen interface 314 and button input 316.

Recently, touchscreen displays have gained prominence as preferred interfaces for many multimedia devices including mobile cellular phones. This is at least in part due to their ease of use, versatility and relative decline in cost. By way of example, the iPod Touch, iPhone and iPhone 3G manufactured by Apple Inc. of Cupertino, Calif. are popular multimedia devices and mobile phones having touchscreen interfaces that facilitate the use of a multitude of multimedia applications. Touchscreens may also be utilized in other computing devices such as PDAs, desktop computers, laptop computers and handheld or tablet computers, among others.

Touchscreen 314 enables a user of computing device 102 to make selections and move a cursor (also referred to herein as a pointer) on the GUI displayed by display device 210 by simply touching the touchscreen over the display via a finger or stylus, for example. Touchscreen 314 recognizes the touch and position (among other attributes) of the touch event over the display 210 and the computing device 102 interprets the touch event and thereafter performs an action based on the touch event. In particular embodiments, touchscreen 314 may be configured to sense and distinguish between different magnitudes of touches and/or the velocity or acceleration of a touch as a finger or stylus is dragged across the touchscreen.

Touchscreen 314 generally includes a clear touch panel with a touch sensitive surface. The touch panel is generally positioned in front of the display 210 such that the touch sensitive surface covers most or all of the viewable area of the display screen. In the illustrated embodiment, the touch sensitive portion of touchscreen 314 is positioned over the entire display screen of display device 210. In an alternate embodiment, the touch screen 314 may be integrated with display device 210. Touchscreen 314 registers touch events and sends these signals to a touchscreen controller. The controller processes these signals and sends the data to the processor 204. Computing device 102 also generally includes a software driver that serves to translate the touch events into computer input events. In this way, the touchscreen 314 allows a user to move an input pointer or make selections on a GUI displayed on the display device 210 by simply touching or pointing at the GUI on the display screen. Touchscreens have several advantages over other input technologies such as touchpads, mice, etc. By way of example, since a touchscreen may be positioned over the entire display, a user can, for all intents and purposes, manipulate the GUI on the display directly.

Touchscreen 314 may utilize any suitable touchscreen technology incorporating one or more of a variety of sensing technologies including capacitive sensing, resistive sensing, optical sensing, surface acoustic wave sensing, pressure sensing, and/or others. Specific details relating to how these various touchscreen technologies function will not be described here as they are known in the art.

In particular embodiments, touchscreen 314 is capable of recognizing multiple touch events that occur at different locations on the touch sensitive surface of the touchscreen at the same time; that is, the touchscreen allows for multiple contact points (hereinafter also referred to as "touch points") to be tracked simultaneously. Touchscreen 314 may generate separate tracking signals for each touch point that occurs on the surface of the touchscreen at the same time. Such a touchscreen may be referred to hereinafter as a "multi-touch" touchscreen. By way of example, the iPod Touch, iPhone and iPhone 3G incorporate such multi-touch touchscreens. The ability to recognize and distinguish multiple touches enables the use of relatively more complex multipoint gestures as inputs that are not otherwise possible with more traditional touchscreens that are only capable of recognizing a single touch event even when the touchscreen is touched at multiple points at the same time. However, various embodiments of the present disclosure may be implemented on non-multi-touch touchscreens as well.

In particular embodiments, computing device 102 is operable to recognize gestures applied to touchscreen 314 and to control aspects of the computing device based on these gestures. In various embodiments, a gesture may be defined as a stylized single or multipoint touch event interaction with the touchscreen 314 that is mapped to one or more specific computing operations. The gestures may be made through various hand and, more particularly, finger motions. Alternatively or additionally, the gestures may be made with a stylus. The touchscreen interface 314 receives the gestures and the processor 204 executes instructions to carry out operations associated with the gestures. In addition, the memory block 206 may include a gestural operation program and associated gesture library, which may be part of the operating system or a separate application. The gestural operation program generally includes a set of instructions that recognizes the occurrence of gestures and informs one or more software agents of the gestures and/or what action(s) to take in response to the gestures.

When a user performs one or more gestures on touchscreen 314, the touchscreen relays gesture information to the processor 204. Using instructions from memory 206, and more particularly the gestural operation program, the processor 204 interprets the gestures and controls different components of the computing device 102 based on the gestures. The gestures may be identified as commands for performing actions in applications stored in the memory 206, modifying GUI objects shown on the display 210, and modifying data stored in memory 206, among other actions. By way of example, the gestures may initiate commands associated with zooming, panning, scrolling, paging, rotating and sizing, among others. Additionally, the commands may also be associated with launching a particular program or application, opening a file or document, viewing a menu, making a selection and executing instructions, among others.

A wide range of gestures may be utilized. These gestures may be stored in a gesture library within memory block 206. Generally, the number of recognizable touch events or gestures may vary according to the needs of a particular application. By way of example, the gestures may be single point or multipoint gestures; static or dynamic gestures; continuous or segmented gestures; and/or others. Single point gestures are those gestures that are performed with a single contact point, e.g., the gesture is performed with a single contact on the touchscreen 314, such as from a single finger, palm or stylus. Multipoint gestures are those gestures that are performed with multiple contact points, e.g., the gesture is performed with multiple touches as for example from multiple fingers, fingers and palms, a finger and a stylus, multiple styli and/or any combination thereof. Static gestures are those gestures that do not include motion while dynamic gestures are those that include motion, e.g., when one or more fingers is dragged across the touchscreen 314. Continuous gestures are those gestures that are performed in a single stroke, and segmented gestures are those that are performed in a sequence of distinct steps or strokes. In some embodiments, local computing device 102 enables a user to customize various gestures and/or create new gestures.

In particular embodiments, local computing device 102 is configured to register multiple gestures at the same time, i.e., multiple gestures can be performed simultaneously. By way of example, a zoom gesture may be performed at the same time as a rotate gesture, or a rotate gesture may be performed at the same time as a pan gesture. Local computing device 102 may also be configured and programmed to allow and register other gesture combinations, including those involving three or more different gestures performed at the same time.

In particular embodiments, local computing device 102 is configured to immediately recognize the gestures applied to the touchscreen 314 such that actions associated with the gestures can be implemented at the same time (or approximately the same time) as the gesture, i.e., the gesture and corresponding action occur approximately simultaneously. By way of example, during a scrolling gesture, the elements displayed on the display 210 move with the associated finger motion across the touchscreen 314.

In particular embodiments, an object presented on local display 210 is continuously manipulated based on the gesture applied on the touchscreen 314. More particularly, there may be a direct relationship between the gesture being applied to the touchscreen 314 and the object(s) or background shown on the display 210. By way of example, during a zooming gesture, two or more fingers in contact with the touchscreen 314 may be spread apart or closer together in order to cause the object and/or background shown on the display 210 to zoom in during the spreading and zoom out during the closing. During such an operation, the local computing device 102 may recognize the user input as a zoom gesture, determine what action should be taken, and output control data to the processor 204, which may initiate a zoom operation on the local display 210.

In particular embodiments, the computing device 102 provides region sensitivity such that identical gestures cause different actions to be performed when implemented over different regions or objects in the GUI displayed on local display 210. By way of example, a rotation gesture over a volume knob displayed on the local display 210 may cause volume increase/decrease, whereas a rotation gesture over a photo may cause rotation of the photo.

In particular embodiments, the number of fingers in contact with the touchscreen 314 may indicate various different input modes. By way of example, a single touch by a single finger may indicate the desire to perform tracking, i.e., pointer or cursor movements or selections, whereas multiple touches by a group of fingers may indicate the desire to perform multipoint gesturing. The number of fingers for implementing gesturing may vary. By way of example, two fingers may indicate a first gesture mode, three fingers may indicate a third gesture mode, while four or more fingers may indicate other modes. Alternatively, any number of fingers may be used for the same gesture mode in other embodiments. The orientation of the fingers may similarly be used to denote a desired mode. The profile of the finger may also be detected to permit different modal operations based on whether the user uses his thumb or index finger, by way of example.

In particular embodiments, an input can be changed while making a continuous stroke on the touchscreen 314 without stopping the stroke (e.g., without lifting off the touch sensitive surface). By way of example, a user may be able to switch from a tracking (or selection) mode to an alternate gesturing mode while a stroke is being made. In an example embodiment, tracking or selections may be associated with a single finger touch event while gesturing may be associated with multiple finger touch events. In this way, the user can toggle between tracking/selection and gesturing by picking up and placing down a second finger on the touchscreen 314. In another example embodiment, a user can switch from one gesture mode to another gesture mode while a stroke is being made. By way of example, zooming may be associated with spreading a pair of fingers and rotating may be associated with rotating the pair of fingers. In this way, the user can toggle between zooming and rotating by alternating the movement of their fingers between spreading and rotating. In yet another example embodiment, the number of gesture inputs may be changed while a stroke is being made (e.g., added or subtracted). By way of example, during zooming where the fingers are spread apart, the user may further rotate their fingers to initiate both zooming and rotation. Furthermore, during zooming and rotation, the user may stop spreading his or her fingers so that only rotation occurs. In other words, the gesture inputs can be continuously input, either simultaneously or consecutively.

In one particular embodiment, a single finger touch event may initiate tracking (or selection) while a touch event associated with two or more fingers in close proximity to one another may initiate scrolling or panning. By way of example, during tracking, cursor movement is controlled by the user moving a single finger on the touch sensitive surface of the touchscreen 314. The sensor arrangement of the touchscreen 314 interprets the finger motion and generates signals for producing corresponding movement of the cursor on local display 210. During scrolling, screen movement may be controlled by the user moving dual fingers on the touch sensitive surface of the touchscreen 314. When the combined fingers are moved in the vertical direction, the motion may be interpreted as a vertical scroll event. Similarly, when the combined fingers are moved in the horizontal direction, the motion may be interpreted as a horizontal scroll event. Panning may be accomplished similarly, although panning can generally occur in all directions over the display rather than just the horizontal and vertical directions.

Local computing device 102 also generally includes a system bus 201 that links a wide variety of subsystems including the components described above with reference to FIG. 2. As understood by those skilled in the art, a "bus" refers to a plurality of digital signal lines serving a common function. The system bus 201 may be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

The components shown in FIG. 2 for local computing device 100 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a local computing device.

Figure 4:
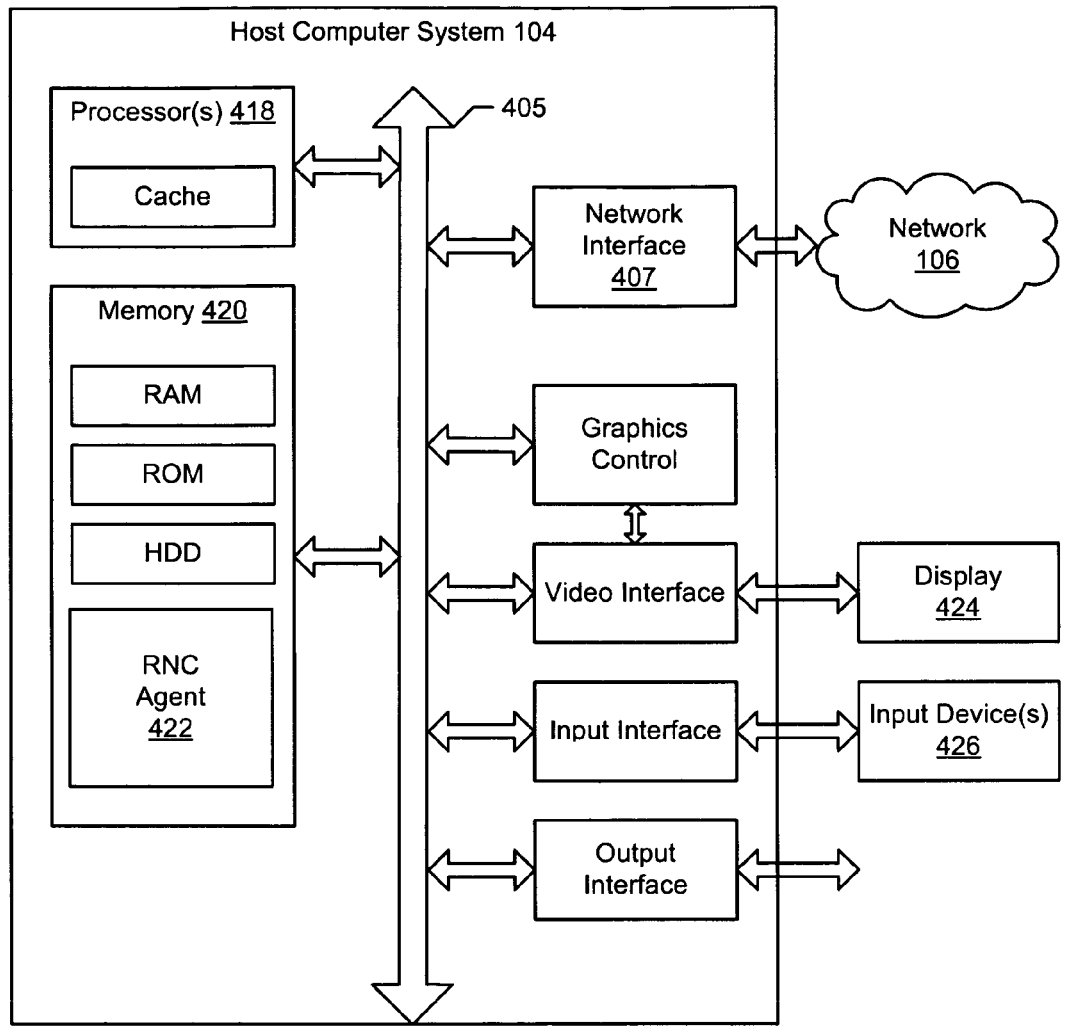
FIG. 4 illustrates a block diagram of an example computer system suitable for use as a host computer system in accordance with an embodiment of the present disclosure.

FIG. 4 illustrates an example computer system suitable for use as host computer system 104. Like local computing device 102, host computer system 104 may also take a variety of forms. In a particular embodiment, host computer system 104 takes the form of a general purpose computer. By way of example, host computer system 104 may take the form of a desktop computer, laptop computer or tablet computer. Additionally, in alternate embodiments, host computer system 104 may take the form of a server, a handled computing device, personal digital assistant (PDA) or any other computer system having suitable processing and other capabilities. In still other embodiment, host computer system 104 may even be a digital heating and/or air conditioning system, alarm system or garage door opener.

Generally, host computer system 104 includes at least some components having similar functionality to those described with reference to the local computing device 102 of FIG. 2. By way of example, host computer system 104 generally includes a processor 418 and a memory block 420 (comprising one or more memory storage devices) storing an operating system and other computer code (e.g., software and/or firmware) including an RNC server 422 that can serve as an RNC server for establishing an RNC session with local computing device 102. Host computer system 104 also generally includes a network interface 407 that enables RNC server 422 to communicate with RNC client 208. Host computer system 104 may also include a display 424 and one or more input devices 426. These and other components of host computer system 104 may be operably coupled via a system bus 405.

Figure 5:
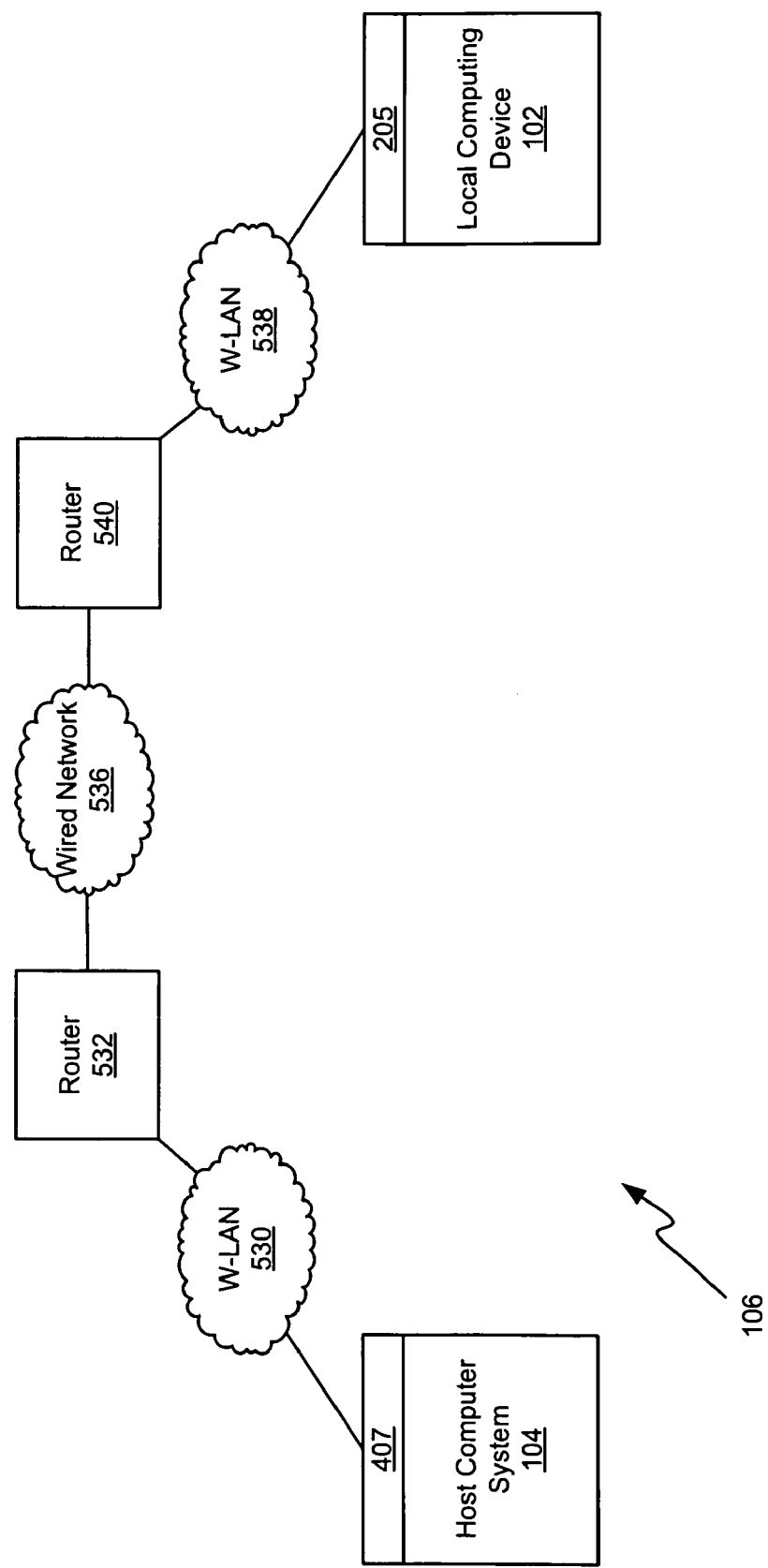
FIG. 5 illustrates an example network link suitable for use in establishing a remote network computing session between a local computing device and a host computer system in accordance with an embodiment of the present disclosure.

Network link 106 may constitute any link or links by which local computing device 102 (via network interface 205) and host computer system 104 (via network interface 407) can establish an RNC session. Network link 106 may include any number or arrangement of interconnected networks including both wired and wireless, particularly Wi-Fi certified, networks. FIG. 5 illustrates an example embodiment of a network link 106. In the embodiment illustrated in FIG. 5, host computer system 104, and more particularly network interface 407, is connected via a wireless local area network (W-LAN) 530 to a router 532. Router 532 serves as an access point connecting W-LAN 530 to a wired network 536. On the other side, local computing device 102, and more particularly network interface 205, is connected via W-LAN 538 and router 540 to wired network 536. If local computing device 102 and host computer system 104 are within range of the same wireless network (e.g., W-LAN 530), then each may be connected to the other via the same wireless network.

In an alternate embodiment in which local computing device 102 includes cellular phone capabilities, local computing device 102 may alternatively be connected to wired network 536 via a cellular network 542. By way of example, cellular network 542 may be a GSM (Global System for Mobile communications) mobile phone network, UTMS (Universal Mobile Telecommunications System) network (e.g., 3G network), or an EDGE compatible (Enhanced Data rates for GSM Evolution) network. In still other embodiments, network link 106 may be a peer-to-peer network (wireless ad-hoc network); that is, local computing device 102 and host computer 104 may be directly connected with one another via, by way of example, Infrared (IR) or Bluetooth protocol technologies.

An example method for determining an action to take based on user input to a touchscreen display interface 314 will now be described with reference to the flowcharts of FIGS. 6A and 6B. In various embodiments, the method may be implemented by touchscreen interface 314 in combination with associated touchscreen software (e.g., including the gestural operation program described above) and the operating system running on the computing device 102, and in some particular embodiments, in combination with an RNC client 208 as described above (hereinafter the combination of the touchscreen and associated hardware, software and/or firmware required to implement the method of FIGS. 6A and 6B may be referred to generally as the "touchscreen").

In the following description, pixel position coordinates may be described with reference to a local image space and a host image space. Host image space coordinates (e.g., $x_H$ and $y_H$) refer to absolute position coordinates associated with the host image display. Local image space coordinates (e.g., $x_L$ and $y_L$) refer to coordinates relative to the local display 210. In particular embodiments, the RNC client 208 tracks the position of the cursor in both local image space and host image space coordinates and is responsible for translating local image space coordinates into host image space coordinates. Additionally, in particular embodiments, all coordinates sent from RNC client 208 at local computing device 102 to RNC server 422 at the host computer 104 are absolute host image space coordinates.

In particular embodiments, three different touchscreen input events are recognized and all actions are based on a combination of one or more of these three input events; that is, all gestures, even those involving multiple touch events, are translated from a combination of one or more of these three inputs events. These inputs events may be referred to as touches_began, touches_moved and touches_ended. By way of example, each time a user makes contact with the touchscreen display interface 314 (e.g., with a finger) a touches_began event is registered. It should be noted that a touches_began event may include two, three or more separate touch points beginning at approximately the same time; that is, a touches_began event may include more than one touch made at approximately the same time. A touches_moved event results when one or more touch points are moved across the touchscreen 314 at approximately the same time, i.e., when a user moves a finger across the touchscreen while maintaining contact with the touchscreen. Finally, a touches_ended event results when one or more touch points are terminated, i.e., when one or more fingers are lifted off the touchscreen at approximately the same time.

The method begins in an idle state at 600 in which the touchscreen is waiting for a touch event. At 602 the touchscreen registers a touches_began event. At 604, a determination is made as to how many touch points constitute the touches_began event. If it is determined at 604 that the touches_began event only included a single touch point, then the method proceeds to 606 where a first timer is started. The method then enters a first waiting period at 608 during which the touchscreen waits for a touch event. If, at 610, an associated touches_ended event is registered, then the method proceeds to 612 where a determination is made as to whether or not the touches_ended event occurred before expiration of the first timer. If the touches_ended event occurred before the first timer expired then the touchscreen sends a mouse_down event (corresponding to the pressing of a mouse button) with associated host image space coordinates describing the position of the cursor to the host computer 104 via RNC client 208, network link 106 and RNC server 422. Otherwise, if the touches_ended event occurred after the first timer expired, then the method returns to the idle state 600.

Alternatively, if, at 616, a touches_moved event is registered, then the method proceeds to 618 where mouse_move event information is sent to the host computer 104. The mouse_move event information includes absolute host image space coordinates describing the position of the cursor at associated time points as the touch point is translated across the touchscreen. Step 618 proceeds until a touches_ended event is registered at 620 at which point the method returns to the idle state 600.

Alternatively, if, at 622, a touches_began event is registered, then the method proceeds to 624 where the touchscreen enters a two-touch state described later with reference to FIG. 6B. The two-touch state can also be entered at step 604 if it is determined that the touches_began event at 602 included two touch points. It should also be noted that other three, four or even more touch states can also exist as will be described later.

Returning back to steps 612 and 614, if the touches_ended event occurred before the first timer expired, then a second timer is started at 626. At 628 it is determined whether or not another touches_began event was registered prior to expiration of the second timer. If not, a mouse_up event is sent at 630 to the host computer 104 and the method returns to the idle state 600. The sending of the mouse_up event results in a "single click" function at the host computer (that is, the combination of the earlier mouse_down event and current mouse_up event result in a single click such as that which would be implemented by the pressing and subsequent releasing of a button on a mouse).

If, on the other hand, a touches_began event is registered prior to the expiration of the second timer, then a third timer is started at 632. The method then enters another waiting period at 634 in which the touchscreen waits for user input. If, at 636, an associated touches_ended event is registered, then the method proceeds to 638 where the determination is made as to whether or not the touches_ended event occurred before expiration of the third timer (indicating that the user intends to perform a "double click" function at the host computer). If the touches_ended event occurred after the third timer expired, the method returns to the idle state 600. If, on the other hand, the touches_ended event occurred before expiration of the third timer, then a mouse_up event, a subsequent mouse_down event, and a subsequent mouse_up event are sent at 640 to the host computer 104 resulting in a double click function at the particular coordinates sent with the first mouse_down event at 614. The method then returns to the idle state 600.

Alternatively, if an associated touches_moved event is registered at 642 (indicating that a user desires to move or drag an object such as an icon or window across the display), then mouse_move event information is sent at 644 to the host computer 104 including absolute host image space coordinates describing the position of the cursor at associated time points as the touch point is translated across the touchscreen. When a touches_ended event is registered at 646, a mouse_up event is sent at 648 to the host computer 104 and the process returns to the idle state 600. Alternatively, if a touches_began event is registered at 650, then the method may enter the two-touch state at 624.

Figure 6A:
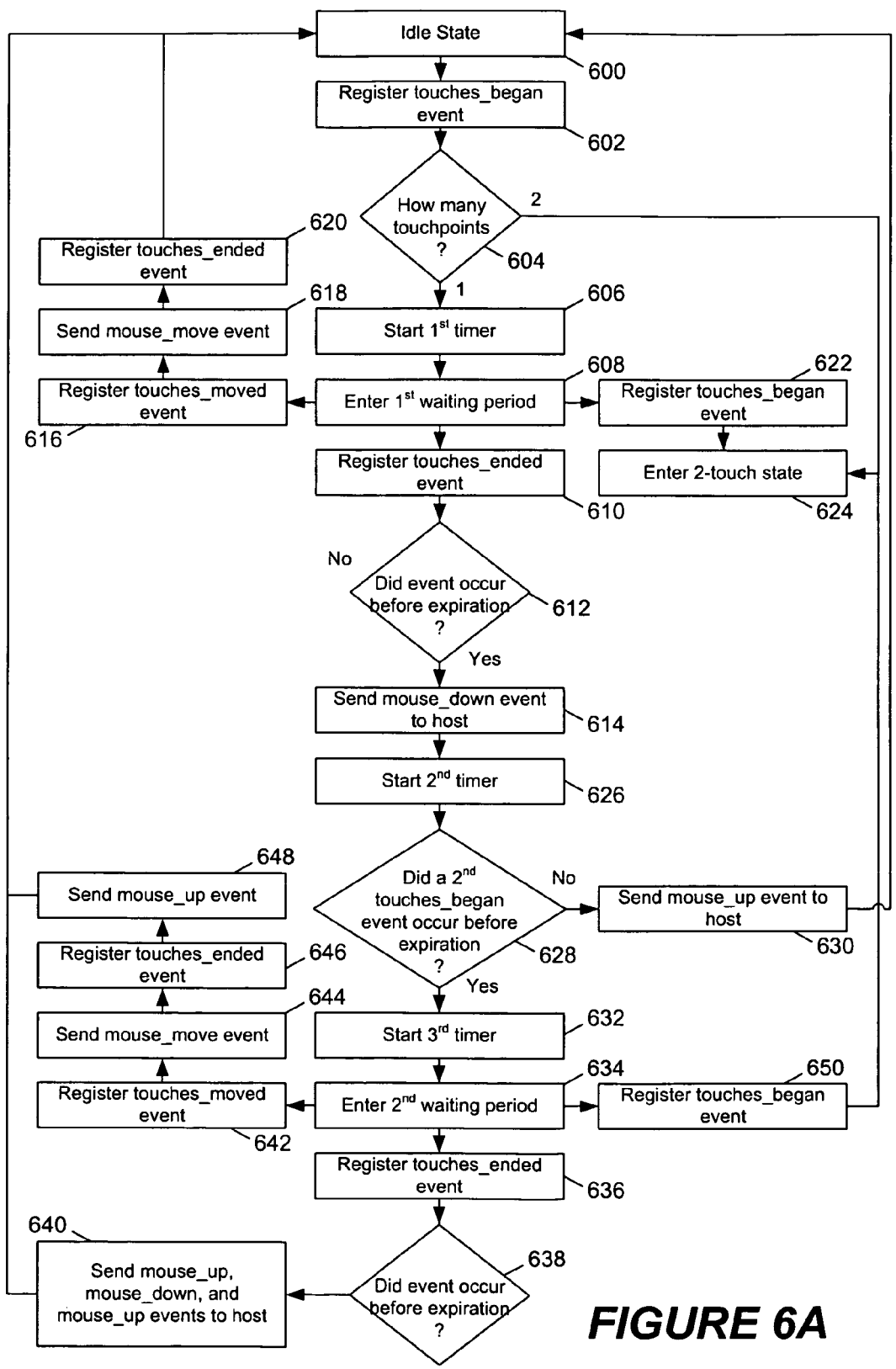
FIG. 6A shows a flowchart illustrating an example method for determining and performing actions based on user input to a touchscreen display interface in accordance with an embodiment of the present disclosure.
Figure 6B:
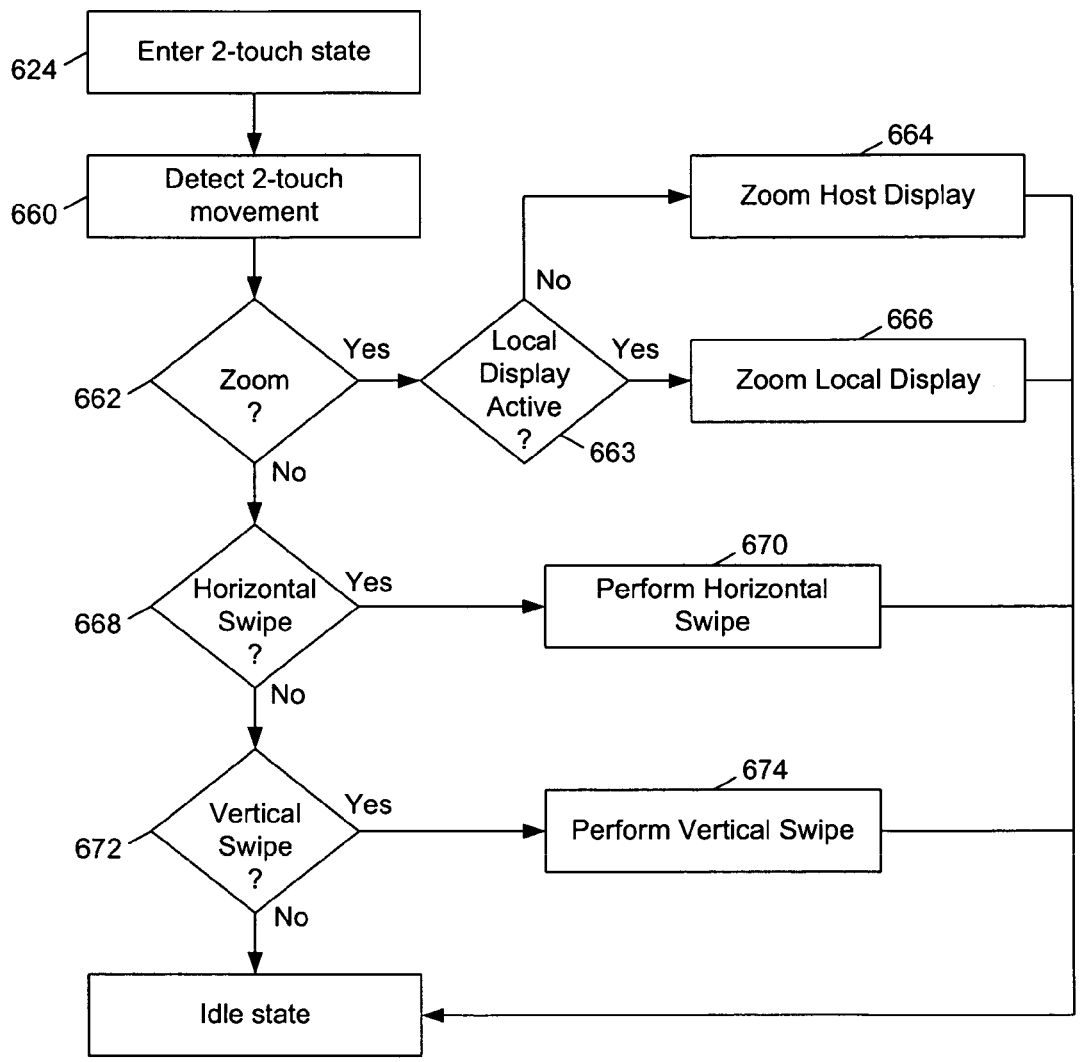
FIG. 6B shows a flowchart illustrating an example method for determining and performing gestures based on two-touch events in accordance with an embodiment of the present disclosure.

FIG. 6B describes example embodiments of two-touch events and associated functions. FIG. 6B begins at 624 with entering the two-touch state. At 660, two-touch movement is detected; that is, either both the two touch points are being moved across the touchscreen or one touch point is being moved relative to the other touch point. At 662, it is determined whether or not the two-touch movement is a zoom gesture (e.g., a zoom-in or a zoom-out gesture). By way of example, if it is determined that the relative distance between the two touch points is increasing, then the movement may indicate the desire to perform a zoom-in gesture. Conversely, if is determined that the relative distance between the two touch points is decreasing, then the movement may indicate the desire to perform a zoom-out gesture. To make this determination practical, there may be associated zoom-in and zoom-out thresholds that the touchscreen compares to the relative movement between the two touch points.

In some particular embodiments, if it is determined at 662 that the two-touch movement is a zoom gesture, then it is then determined at 663 whether or not the local display 210 is active. More particularly, in some embodiments a user may be using touchscreen 314 to control host computer 104 as though touchscreen 314 were effectively a wireless touchpad. In these embodiments, the host display 424 would generally be in view of the user and the local display 210 may display only input options. By way of example, such an embodiment may be useful if a user was giving a presentation (e.g., a PowerPoint presentation) and wanted to use the local computing device 102 to navigate and manipulate slides on a display 424 in view of the user. In this example embodiment, local display 210 may not be active and the zooming gesture would initiate a zoom at 664 on the host display 424 instead. In embodiments in which local display 210 is active, the zooming gesture may initiate a zoom on the local display 210 at 666 instead of or in addition to a zoom on the host display 424.

Whether the local display 210 is active or not may also be a relevant determination in the single-touch flowchart of FIG. 6A. More particularly, in some embodiments, if the local display 210 is not active, cursor movement resulting from a touches-moved event may result in cursor movement only on the host display 424. In embodiments in which the local display 210 is active, the touches-moved event may result in cursor movement on the local display 210 instead of or in addition to on the host display 424.

Referring back to FIG. 6B, if it is alternatively determined at 662 that that the two-touch movement is not a zoom gesture, then the method proceeds to 668 where it is then determined whether the two-touch movement is a horizontal swiping gesture. Again, there may be a threshold for determining whether both touch points are being translated horizontally in the same direction. If the two-touch movement is a horizontal swiping gesture, then a horizontal swipe is performed at 670 on the local display 210. By way of example, this may result in a paging function in which a next page or a next slide is presented.

Alternatively, if it is determined at 668 that the two-touch movement is not a horizontal swiping gesture, then the method proceeds to 672 where it is then determined whether the two-touch movement is a vertical swiping gesture. Again, there may be a threshold for determining whether both touch points are being translated vertically in the same direction. If the two-touch movement is a vertical swiping gesture, then a vertical swipe is performed at 674 on the local display 210. By way of example, this may result in a scrolling function in which pages displayed on local display 210 are scrolled.

At any time during the method shown by the flowchart illustrated in FIG. 6B, when a touches_ended event is registered, the method may proceed back to the idle state 600 if both touch points are terminated (e.g., both fingers are lifted off the touchscreen) or back to a single-touch state (FIG. 6A) if only one touch point is terminated (e.g., one finger is lifted off the touchscreen).

It should be noted that other one and two-point gestures may also be implemented in other embodiments in place of or in addition to the one and two-point gestures just described. Additionally, three and four (and even more) point gestures may also be implemented in various embodiments. By way of example, a three-touch tap may indicate the desire to perform a quick zoom at a fixed zoom level while a second three-touch tap may return the display to the zoomed-out state. As another example, a three-touch downward swiping gesture may cause the display 210 to display all the open applications while a three-touch upward swiping gesture may cause the display 210 to display the current desktop view. Additionally, a three-touch rightward swiping gesture may open up the task manager window. Furthermore, in some embodiments, a user is allowed to customize various gestures including adding new user-designed gestures.

Figure 7:
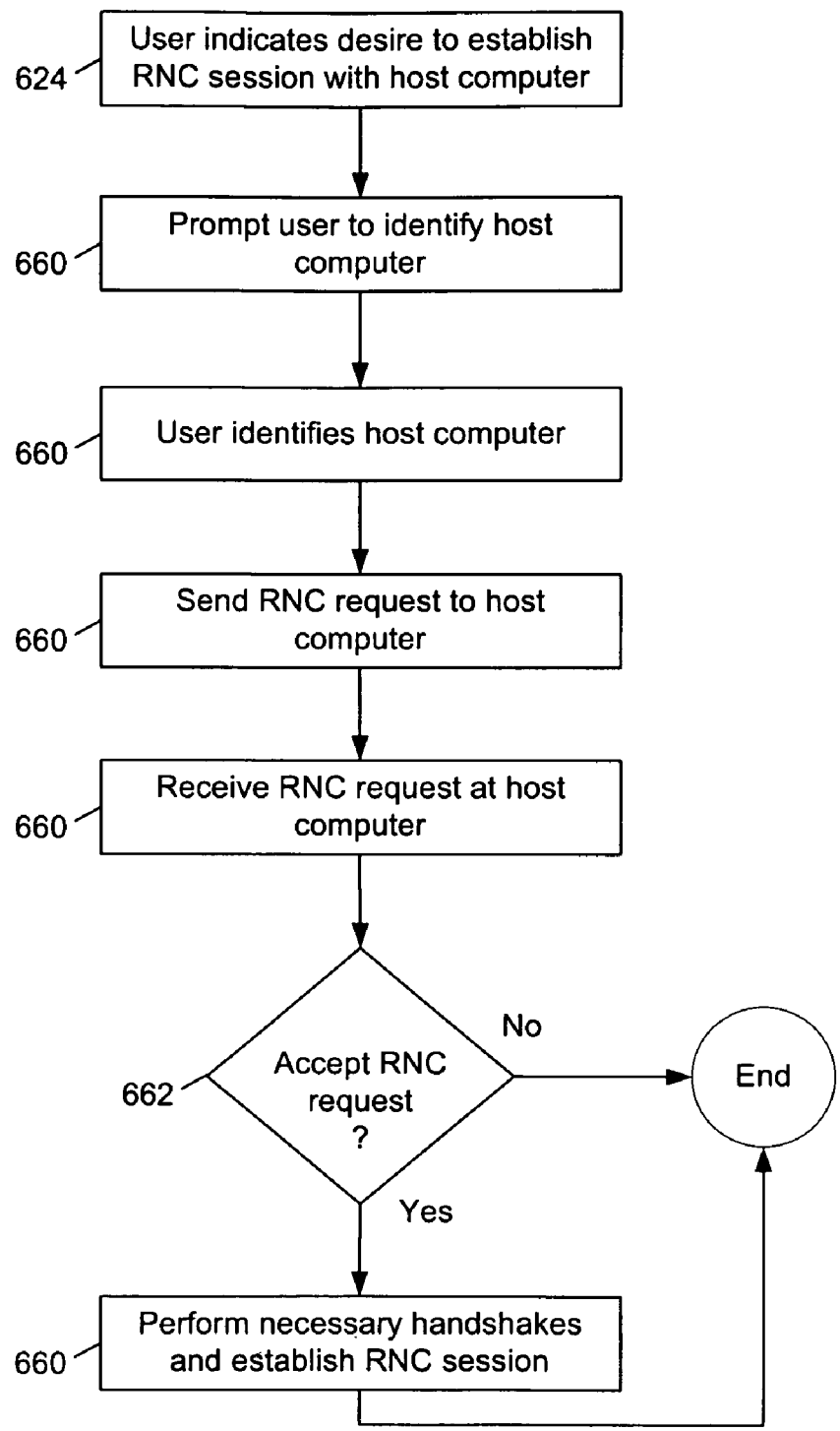
FIG. 7 shows a flowchart illustrating an example method for initiating a remote network computing session between a local computing device and a host computer system over a network link in accordance with an embodiment of the present disclosure.
Figure 8A:
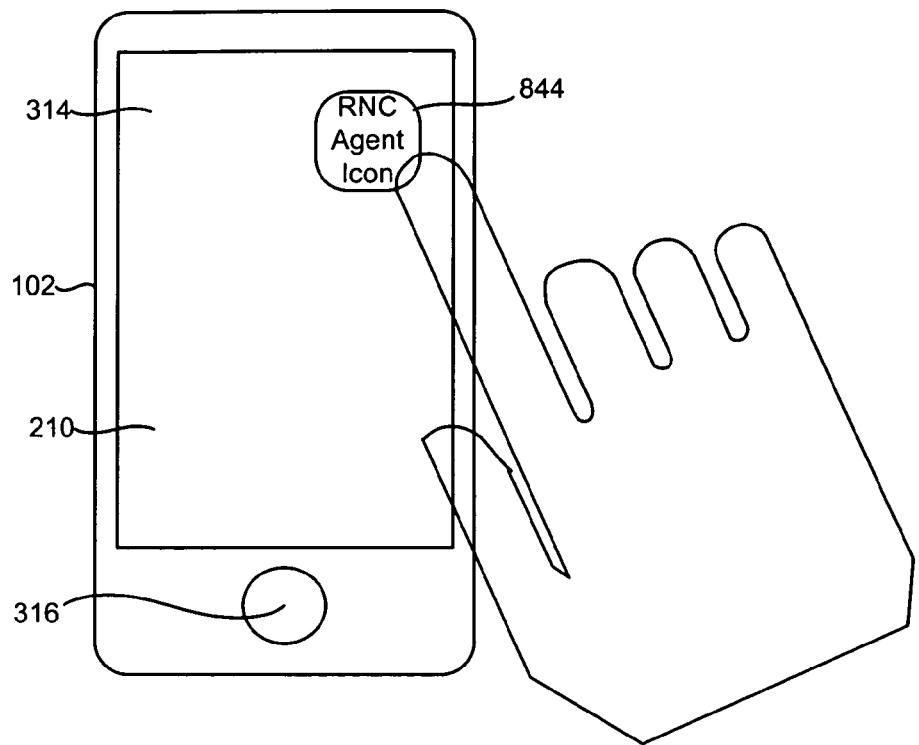
FIGS. 8A and 8B illustrate a touchscreen display interface of a local computing device at respective steps in the method of FIG. 7 in accordance with an embodiment of the present disclosure.
Figure 8B:
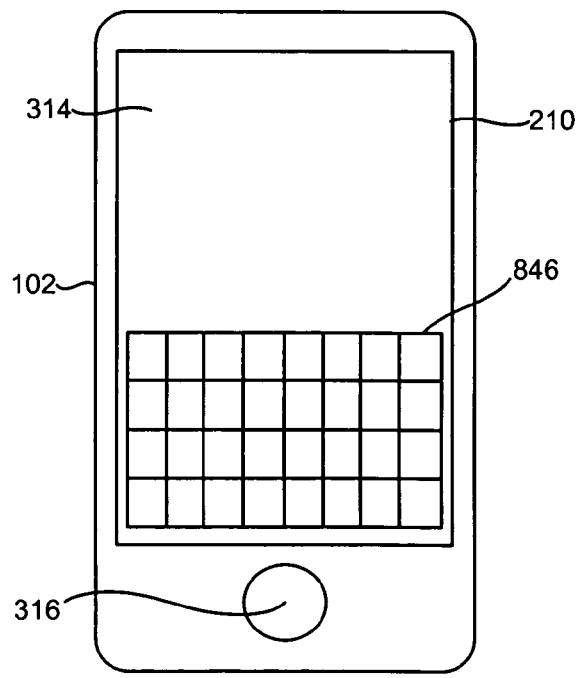

An example method for initiating an RNC session between local computing device 102 and host computer system 104 over network link 106 will now be described with reference to the flowchart of FIG. 7 in conjunction with FIGS. 8A and 8B. At 702, a user indicates a desire to establish an RNC connection with host computer system 104. In a particular embodiment, a user indicates this desire by tapping (e.g., a single click) touchscreen 312 over a specialized RNC agent icon or widget 844 within the GUI displayed on display 210 as shown in FIG. 8A. The user may then be prompted at 704 to identify the host computer 104 that the user would like to establish the RNC connection with. In a particular embodiment, the user may enter the IP address and any additional identifying information using a virtual keyboard 846 displayed on display 210 at 706 as shown in FIG. 8B. In one embodiment, the user may store the IP address and/or other information for ease of use in establishing RNC sessions with host computer system 104 at future dates.

At 708, an RNC client 208 in local computing device 102 sends an RNC request over network link 106 to host computer system 104. RNC server 422 in host computer system 104 receives the request at 710. Generally, RNC server 422 is always listening for RNC requests. By way of example, in a particular embodiment, RNC server 422 listens over TCP (Transmission Control Protocol) port 3389 or TCP port 5900. At 712, RNC server 422 determines whether or not to accept the request. If RNC server 422 accepts the request, then RNC server 422 proceeds to negotiate various RNC parameters with RNC client 208 and perform any other necessary handshakes to establish an RNC session at 714; otherwise, the process ends.

Various embodiments for using a handheld computing device 102 having a touchscreen display interface to control a host computer system 104 will now be described with reference to FIGS. 9-12. Once an RNC session is established between local computing device 102 and host computer system 104 over network link 106, RNC client 208 at local computing device 102 assumes the role of the RNC client while RNC server 422 at host computer 104 assumes the role of the RNC server.

Host computer system 104 sends (via RNC server 422, processor 418 and network interface 407) graphical display information over network link 106 to the local computing device 102 at various times. By way of example, in some embodiments, host computer system 104 may send graphical display information to local computing device 102 on a periodic basis (e.g., at fixed time intervals). In particular embodiments, rather than or in addition to on a periodic basis, host computer system 104 sends graphical display information to local computing device 102 after receiving a request for graphical display information from local computing device 102. In other particular embodiments, host computer system 104 may also send graphical display information to local computing device 102 after receiving an input event from local computing device 102 in addition to on a periodic basis and/or when requests are received.

In particular embodiments, local computing device 102 sends (via RNC client 208, processor 204 and network interface 205) input event information to host computer system 104 whenever an input event is performed at local computing device 102. By way of example, local computing device 102 sends mouse_up, mouse_down and mouse_move event information as well as associated cursor coordinate information whenever appropriate as determined, for example, by the methods described with reference to the flowcharts of FIGS. 6A and 6B. Local computing device 102 may also send host computer system 104 input event information related to inputs other than those already described. By way of example, display 210 in conjunction with RNC client 208 may be configured to display a virtual keyboard and local computing device 102 may send virtual keyboard entries to host computer system 104 whenever the virtual keyboard entries are initiated (e.g., by tapping the touchscreen 314 over the desired virtual keys). As another example, display 210 may be configured to display a numeric keypad, arrow keys, and/or function keys. Furthermore, in some embodiments, local computing device 102 may send host computer system 104 input events related to inputs from other input devices other than touchscreen 314 when appropriate.

Here it should be noted that, in some embodiments, RNC client 208 (or other suitable software agent) may encode and/or encrypt any data sent to host computer system 104. By way of example, encryption may be utilized to secure the connection over network link 106 such that no one can intercept the user's keystrokes or screen display. In a particular embodiment, a 56 or 128-bit (or higher) encryption scheme is used to encrypt the data sent from local computing device 102 to host computer 104. Additionally, host computer 104 (via RNC server 422 or other suitable encryption agent) may also encrypt data sent to local computing device 102.

Figure 9A:
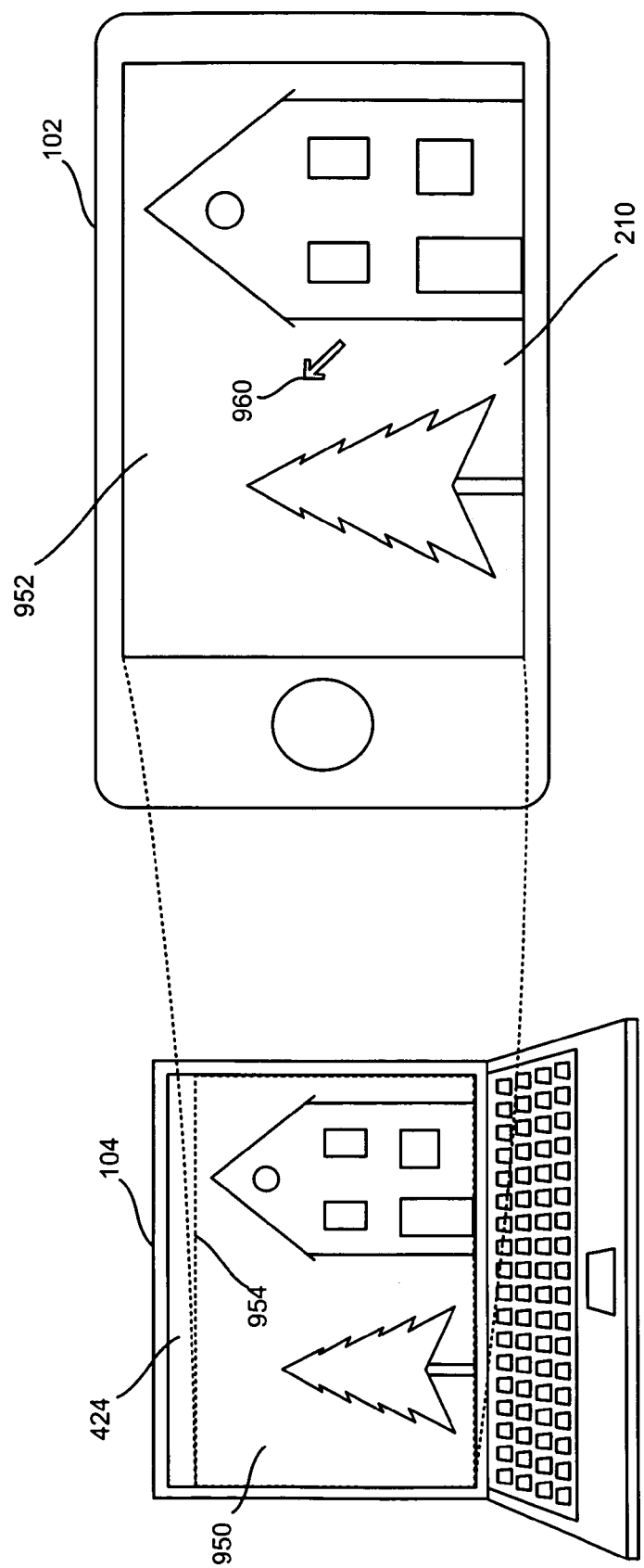

FIG. 9A shows local computing device 102 and host computer system 104 after an RNC session has been established between local computing device 102 and host computer system 104 over network link 106. In particular embodiments, the graphical display information sent from host computer system 104 to local computing device 102 includes pixel data and associated coordinate information (in host image space) describing a host image 950 displayed on the display 424 of host computer 104 (or would be displayed in the case that the display 424 is not active). Local computing device 102 utilizes this display information to render or update a local image 952 on its own display 210 such that the local image 952 shown on display 210 is essentially the same as the host image 950 shown on display 424 of host computer system 104 as shown in FIG. 9A. More particularly, local image 952 is essentially identical to a corresponding portion (which may be the entire image) of host image 950. In particular embodiments, the graphical display information sent from host computer system 104 to local computing device 102 only includes graphical display information related to portions of the host image 950 that have changed since the last graphical display information was sent. In this way, the bandwidth requirements may be significantly reduced. It should also be noted that in some embodiments, various compression techniques may be utilized to further reduce the bandwidth requirements.

In the embodiment illustrated in FIG. 9A, the local image 952 displayed on display 210 of the local computing device 102 is essentially identical to the host image 950 displayed on display 424 of the host computer system 104. However, it should be noted that, in some embodiments, the shapes (e.g., aspect ratios) of the displays 210 and 424 may prevent true 1-to-1 scaling of the host image 950 to the local image 952 even when the local image 952 on display 210 is in its most zoomed-out state (that is, without stretching or otherwise modifying the local image). In other embodiments, local image 952 may be stretched such that local display 210 can accommodate the entire host image 950 (e.g., how a television may stretch a 480i input signal to fit a widescreen display). By way of example, in one embodiment the window defined by dotted line 954 in FIG. 9A illustrates the maximum size of the portion of host image 950 that can constitute local image 952 when the local computing device 102 is oriented horizontally while the window defined by dotted line 956 in FIG. 9B illustrates the maximum size of the portion of host image 950 that can constitute local image 952 when the local computing device 102 is oriented vertically. In this embodiment, local computing device 102 can be optionally configured such that the local image 952 is always upright with respect to the user; hence, when a user changes the orientation of the local computing device 102, the local image 952 rotates depending on the device's orientation.

Figure 9C:
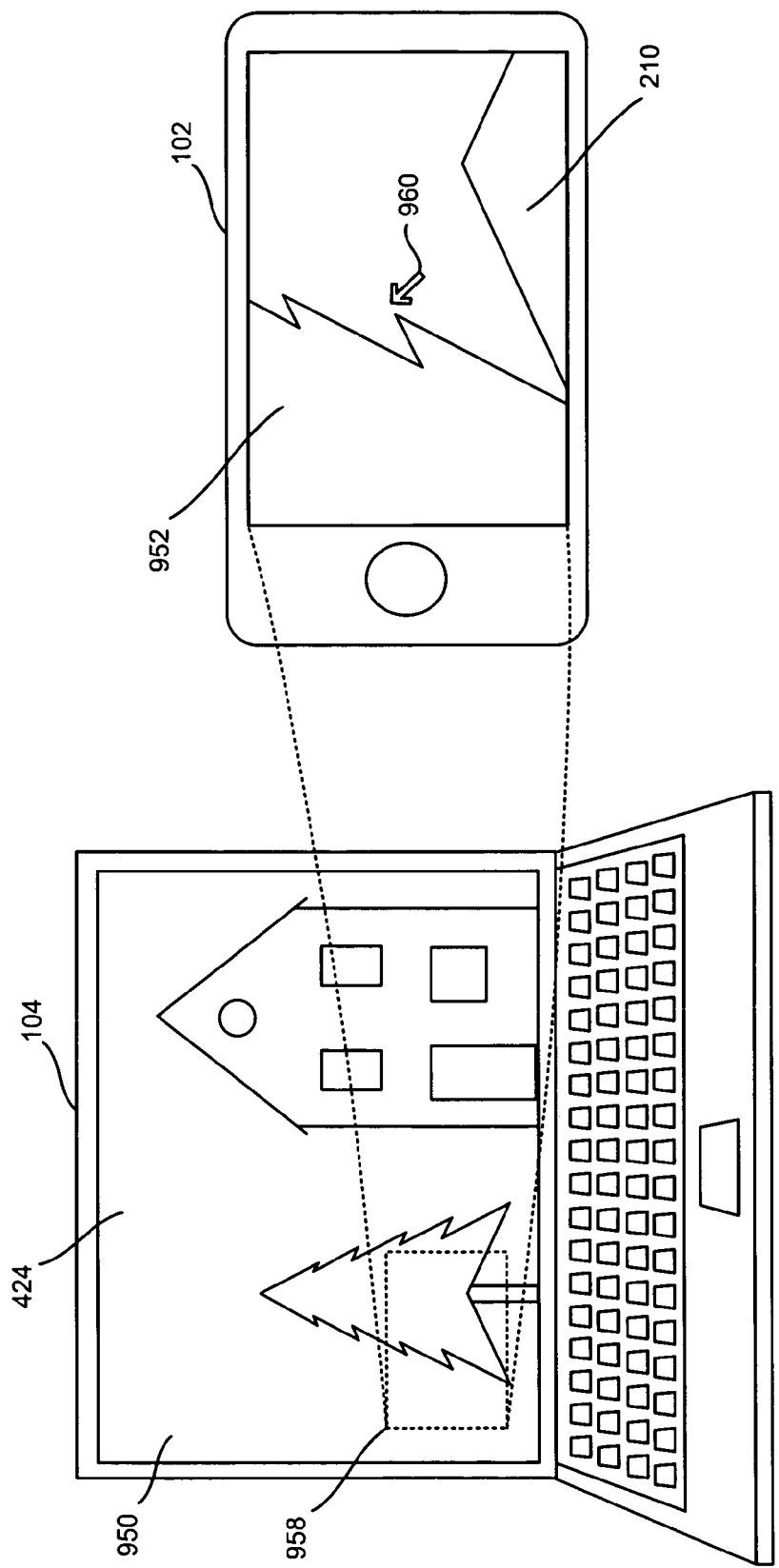

In particular embodiments, a user may zoom in on specific portions or features of the local image 952. By way of example, a user may use the zoom-in gesture described above in which two fingers in contact with the touchscreen 314 are spread apart over the object of interest in local image 952 displayed on display 210 of local computing device 102. FIG. 9C illustrates a comparison between the host image 950 and the local image 952 in an example zoomed-in state. In FIG. 9C, the window defined by dotted line 958 illustrates the portion of host image 950 constituting local image 952 actually displayed at local computing device 102. A user may subsequently zoom out using the zoom-out gesture described above in which two fingers are drawn together.

Figure 9D:
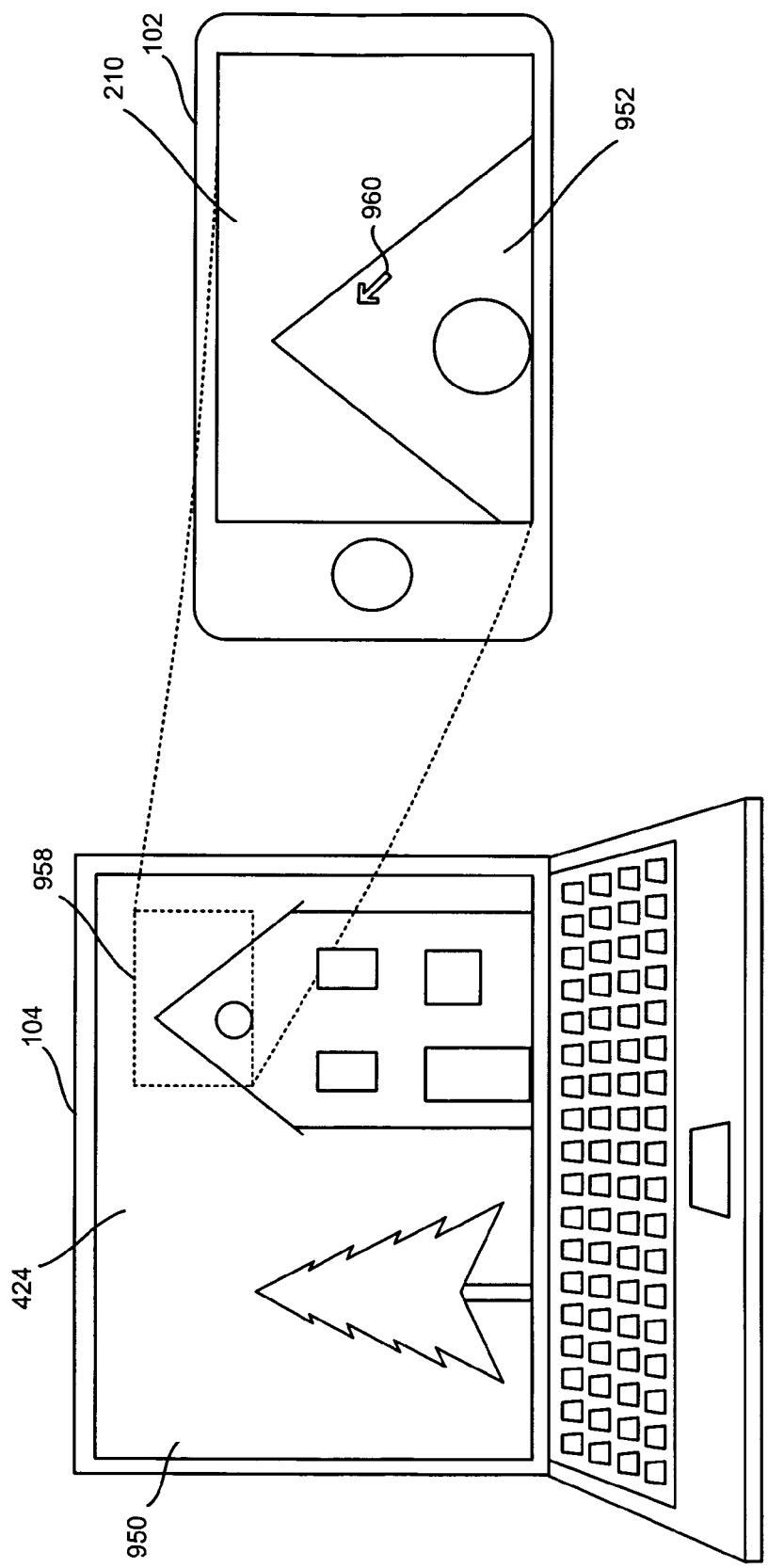

In particular embodiments, a user may translate or pan the local image 952 displayed on display 210 by using a swiping gesture (e.g., a single finger moving across the touchscreen). By way of example, assuming that the local image 952 is in a zoomed-in state as illustrated in FIG. 9C, a user may translate the window or field of view (defined by dotted line 958) that constitutes local image 952 by placing a finger on touchscreen 314 and dragging the point of contact of the finger across the touchscreen in the direction the user desires to translate the local image 952. FIG. 9D illustrates the result of performing a swiping gesture up and to the right of touchscreen 314. As shown in FIG. 9D, the window defining the local image 952 has now effectively moved up and to the right on the host image 950 displayed at the host computer system 104.

As described above, in particular embodiments, the RNC client 208 tracks the position of the cursor in both local image space and host image space coordinates and is responsible for translating local image space coordinates into host image space coordinates. By way of example, the following equations may be used to convert from host image space coordinates to local image space coordinates:

$$x_L = (x_H - x_0) * z \qquad \text{eq(1)}$$

$$y_L = (y_H - y_0) * z \qquad \text{eq(2)}$$

where the coordinates (x0,y0) refer to the top left coordinate of the local display 210 in the host coordinate system and where z is the zoom level of the local display relative to the host image. By way of example, suppose we consider the 750th x-coordinate on the host display 424 (i.e., $x_H$=750). Additionally, suppose the left edge of the window defining the local image 952 is at the 700th x-coordinate (i.e., $x_0$=700) and that the zoom level z of the local image 952 relative to the host image 950 is 2. Using eq(1), we subtract the left edge from the host x-coordinate $x_H$ to get 750−700=50. Thus, if our zoom level was 1 (i.e., no zoom), we would show this pixel at $x_L$=50. However, since we are zoomed in by a factor of 2, we multiple by the zoom level of 2 to get 50*2=100. Thus, this pixel is shown at $x_L$=100 on the local display 210.

In particular embodiments, a cursor or pointer 960 is automatically positioned in the center of local image 952 on display 210 as shown in FIGS. 9C and 9D. In other words, the cursor 960 remains in a fixed position at the center of the physical display 210, the cursor does not change position relative to the physical boundaries of the display screen of display 210 when the window defining the local image 952 is translated, zoomed or otherwise manipulated around host image 950 (however, during translation, zooming or other manipulation of local image 952, the cursor 960 may lag behind the window defining local image 952 as a result of the time it takes to perform the necessary processing, among other factors, such that the cursor is not exactly in the center of local image 952 during the manipulation of local image 952). Thus, as will be described in more detail below, despite the zoom level and the position of the window defining local image 952 relative to the host image 950 provided by host computer 104, the cursor 960 remains biased to the center of the local image 952 and display 210. This has a significant consequence; that is, when a user desires to move the cursor 960 relative to an object (e.g., an icon or background image) displayed on host image 950, the user gestures towards the object or direction of interest; however, rather than the cursor 960 moving relative to the local display 210, the window defining local image 952 moves relative to the object. That is, even though the cursor 960 remains in the center of the local display 210, the window defining the local image 952 is translated such that the cursor moves relative to the host image 950.

In other embodiments, a translational gesture (e.g., a swiping gesture) may result in movement of the window defining local image 952 in the opposite direction of the gesture. By way of example, a swiping gesture up and to the right on the touchscreen would result in the window defining local image 952 moving down and to the left. In these embodiments, a cursor may still be biased to the center of the local display 210.

In still other embodiments, a translational gesture (e.g., a swiping gesture) may result in the movement of the cursor on local display 210, rather than movement of the window defining local image 952 relative to the host image 950. In some implementations, a user may have the option to switch between any of the aforementioned embodiments during an RNC session.

Figure 10:
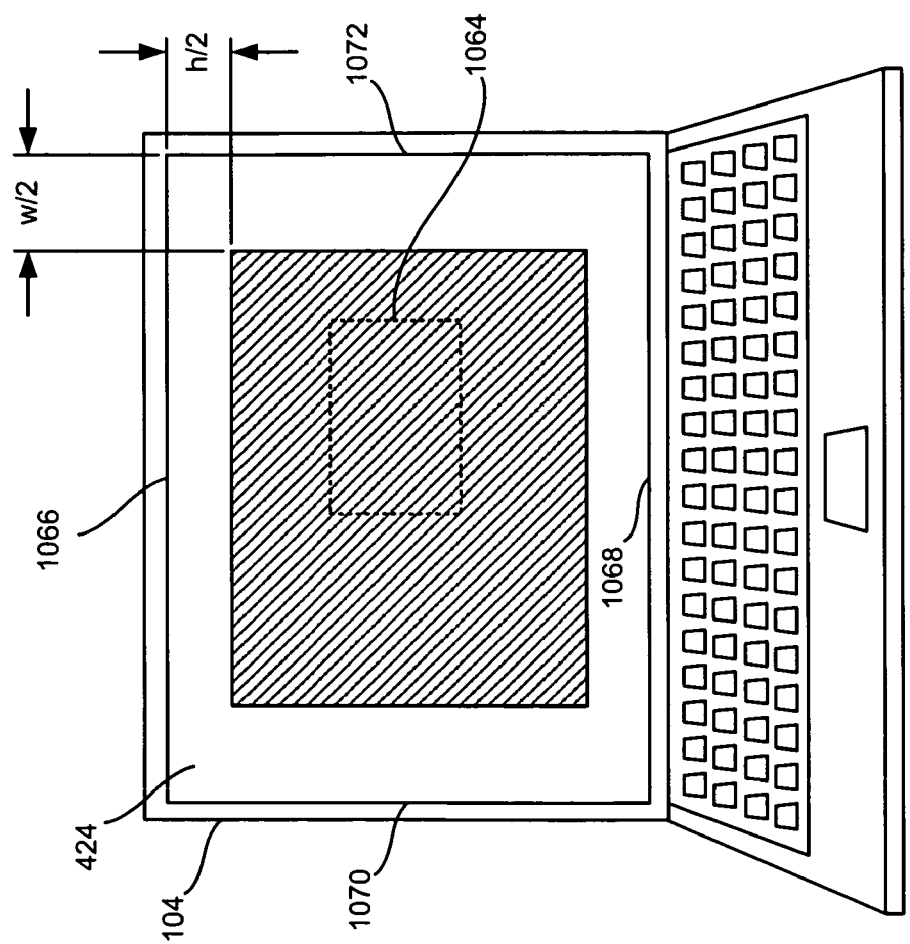
FIG. 10 illustrates a local computing device display and associated center bias feature in accordance with an embodiment of the present disclosure.

In particular embodiments, the aforementioned center bias rule is only broken when an edge of the host image 950 is approached or reached (in other embodiments the center bias rule is never broken). More particularly, once an edge 962 of host image 950 is reached and the user continues a swiping gesture (e.g., resulting in a pan on the display 210) towards the edge, the cursor 960 then follows the direction of the gesture towards the edge. By way of example, referring to FIG. 10, assume the window 1064 defining local image 952 has a width w and a height h relative to the host image 950 from the host computer system 104. The shaded region of the host image 950 shown in FIG. 10 represents the region of the host image 950 in which the cursor 960 would be in the center of the corresponding local image 952 on display 210. In the illustrated embodiment, once the center of the window 1064 defining local image 952 moves within h/2 of the top or bottom edges 1066 and 1068, respectively, of the host image 950 or within w/2 of the left or right edges 1070 and 1072, respectively, of the host image 950, the cursor 960 would then move into the non-shaded region of FIG. 10 if, for example, a swiping gesture is made towards the associated edge.

Figure 11A:
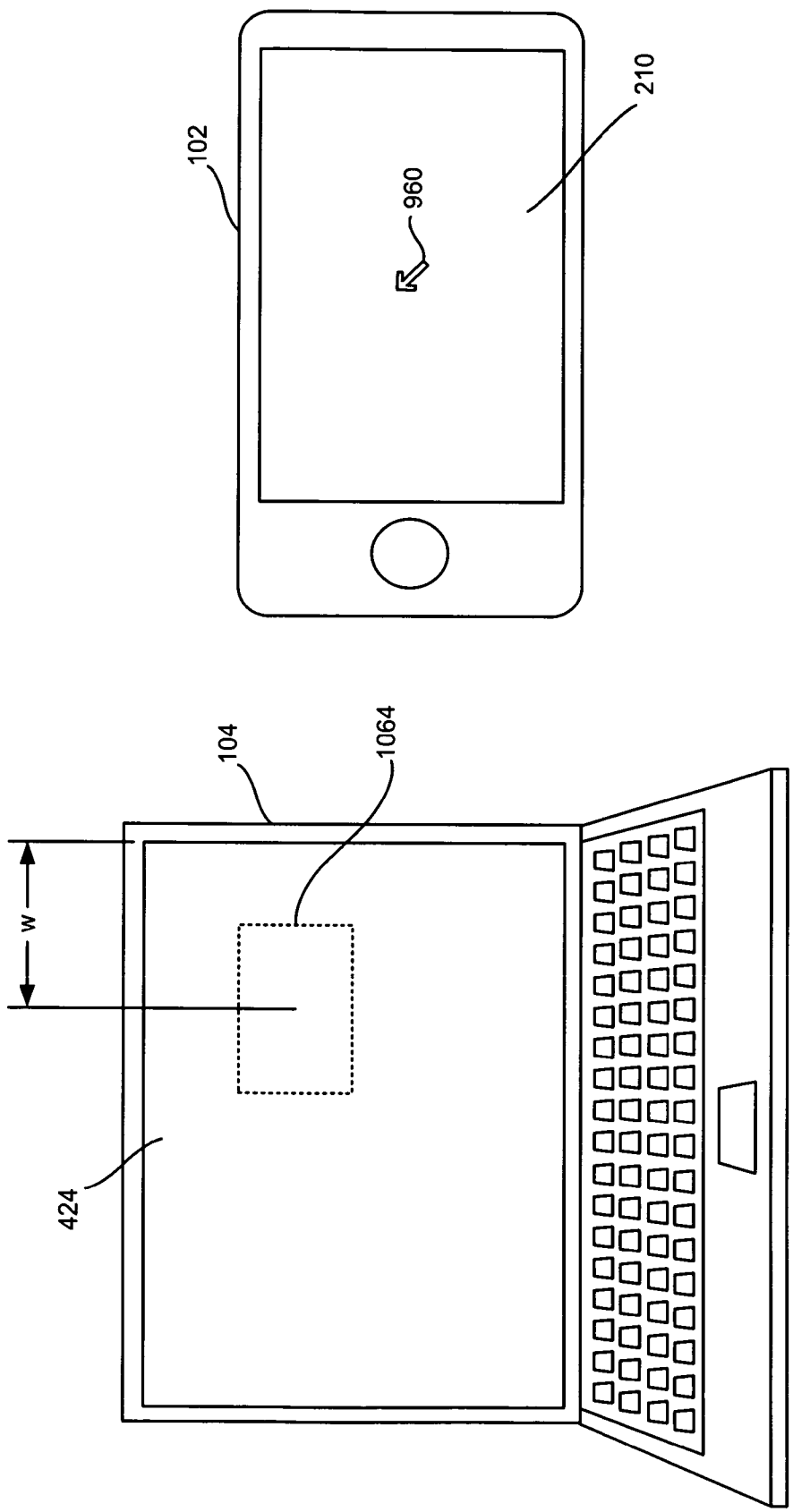
FIGS. 11A-11C illustrate a local computing device display and associated center bias feature during a translation of the window defining a local image in accordance with an embodiment of the present disclosure.
Figure 11B:
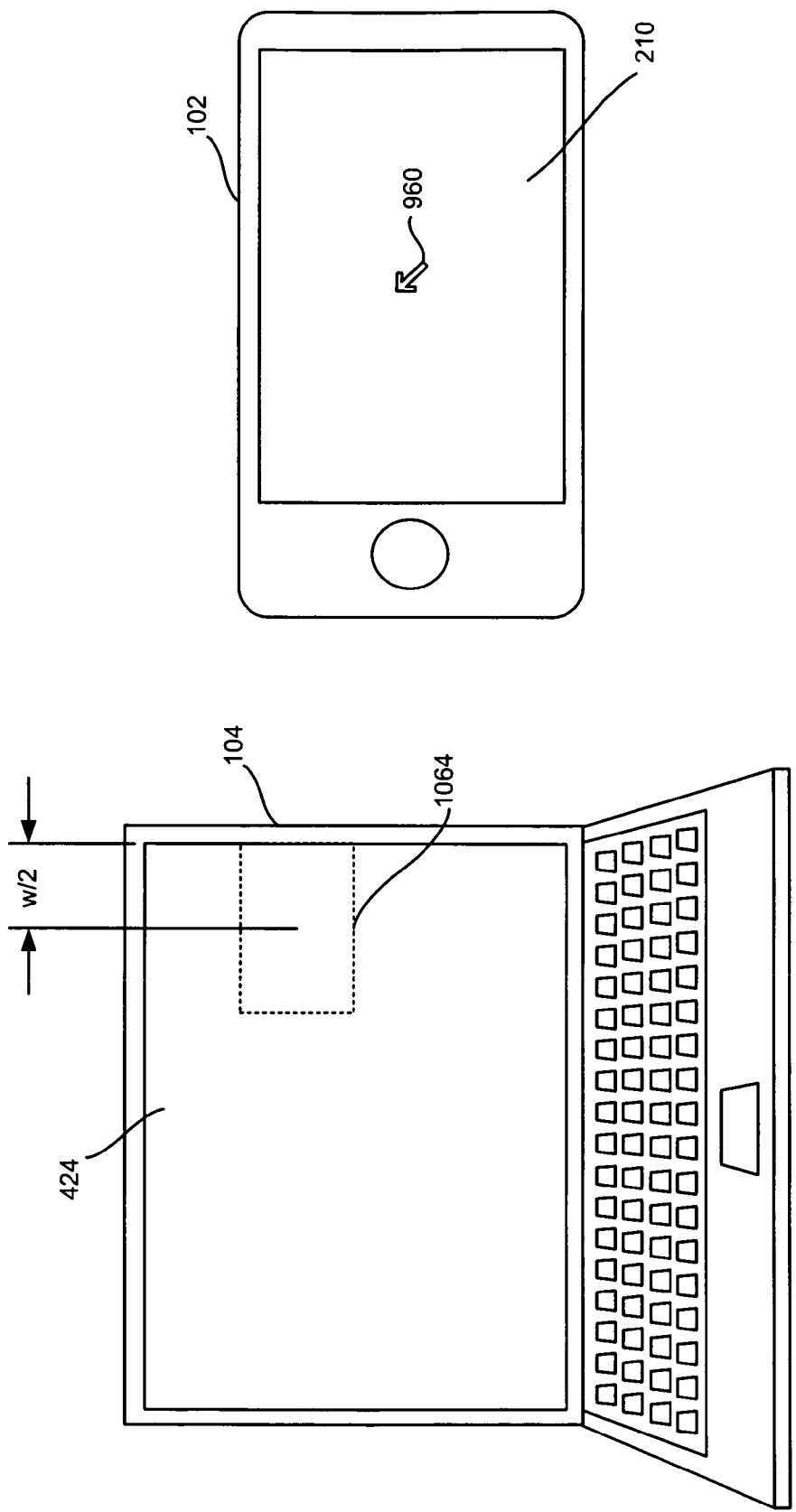
Figure 11C:
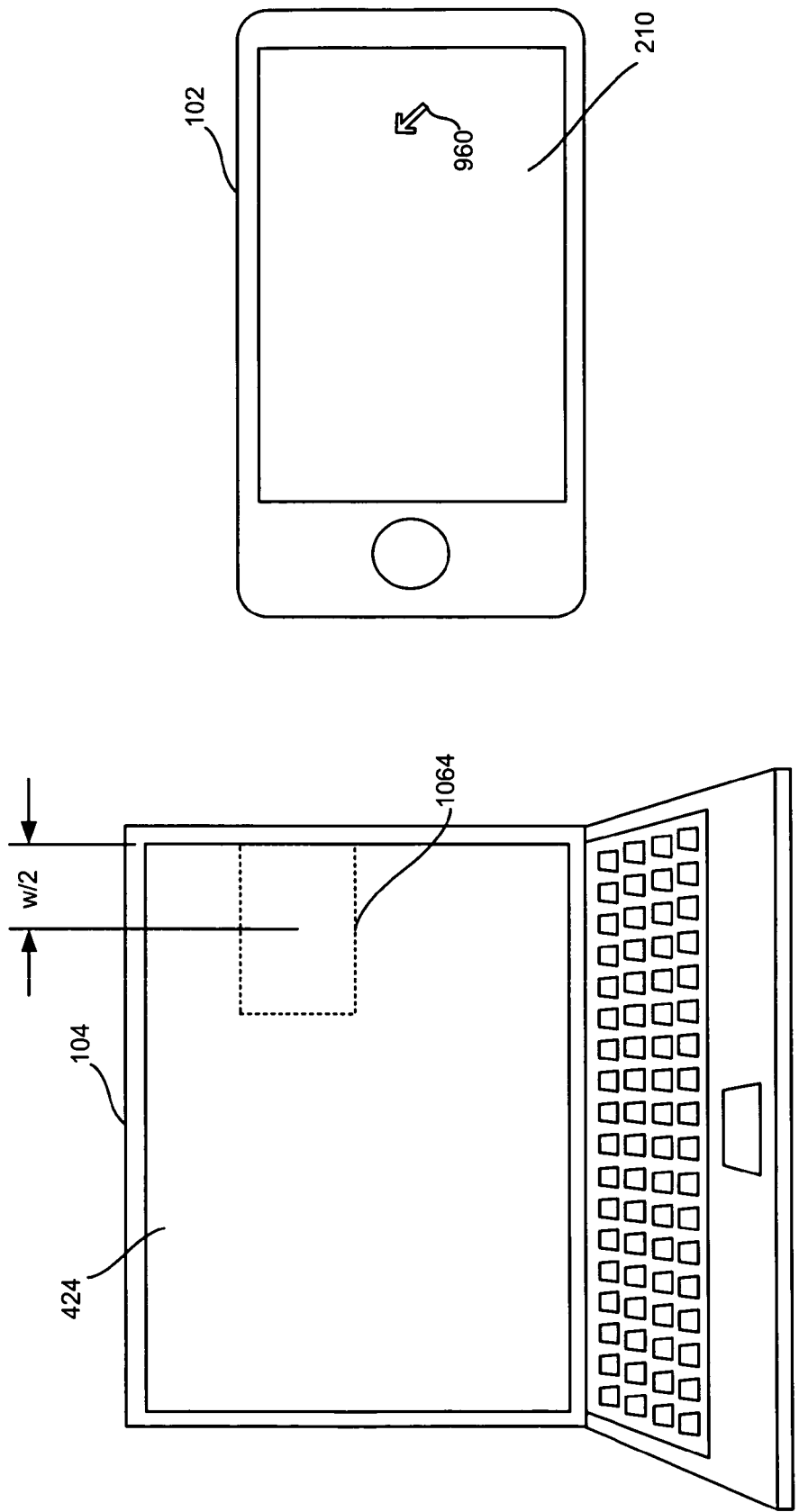

By way of example, FIG. 11A illustrates host display 424 and local display 210 when the center of the window 1064 defining local image 952 is moved, for example with a rightward swiping gesture, to a distance w relative to the right edge of host image 950. FIG. 11B illustrates the result of continuing to move the center of the window 1064 to a distance w/2 relative to the right edge of host image 950. Finally, FIG. 11C illustrates the result of continuing the rightward swiping gesture after the center of the window 1064 is at the minimum distance w/2 relative to the right edge. As shown in FIG. 11C, the cursor 960 in the local display 210 is no longer in the center of the display, rather, the cursor is now in the right half of the display.

It should be noted that, in the maximum zoomed-out state, the center bias feature may not be evident as at least one edge or boundary of host image 950 is generally in view.

In particular embodiments, the absolute size of the cursor remains constant relative to the user regardless of the zoom level of the display 210. In such embodiments, the cursor 960 on display 210 is generated internally by local computing device 102; that is, the cursor 960 is not a reproduced version of the native cursor displayed on host display 424.

Figure 12:
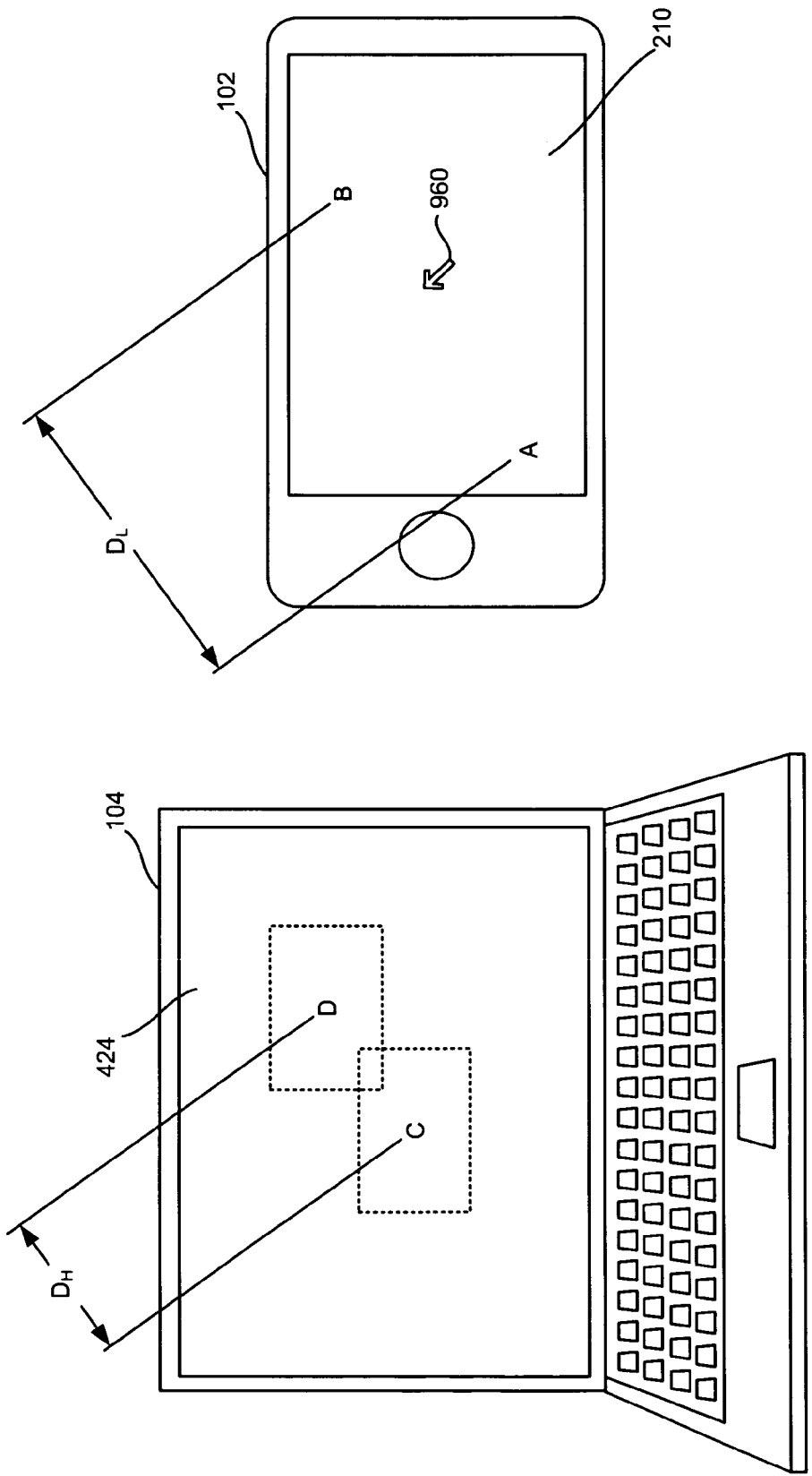
FIG. 12 illustrates a local computing device display and host computer system display during a translation of the window defining a local image in accordance with an embodiment of the present disclosure.

Furthermore, in particular embodiments, there is no 1-to-1 correspondence between the location of the touch point and the location of the cursor 960 on display 210. By way of example, FIG. 12 illustrates local computing device 102, having display 210 and local image 952, and host computer system 104, having display 424 and host image 950. A swiping gesture of a finger from point A to point B on the touchscreen over display 210 results in a translation of the center of the window defining local image 952 from point C to point D on host image 950. In this way, local computing device 102 emulates a wireless touch pad for controlling host computer system 104. Note that the distance $D_H$ from point C to point D is related to the distance $D_L$ from point A to point B by the following equation:

$$D_H = \frac{D_L}{z} \qquad \text{eq(3)}$$

In particular embodiments, a single touch (tap) on the touchscreen 314 does not move the cursor 960 to the location of the contact point; rather, the effect of a single tap or double tap depends on the location of the cursor. More specifically, if the cursor 960 is positioned over an icon, a single tap anywhere on the touchscreen may result in a single click that opens or activates a window, application or program associated with the icon under the cursor 960. Similarly, a double tap anywhere on the touchscreen may result in a double click that opens or activates the application or program associated with the icon under the cursor 960.

In particular embodiments, the speed and/or distance the cursor 960 moves relative to the local image 952 have 1-to-1 relationships, respectively, with the speed and distance of the applied gesture on the touchscreen 314 over the local image 952 displayed on display 210. More specifically, in a particular embodiment, during a swiping gesture the movement of the cursor 960 on display 210 has a 1-to-1 relationship with the movement of the finger across the display 210. That is, by way of example, if a user translates his or her finger 2 cm across the touchscreen over display 210 at 2 cm/s, the cursor will move 2 cm relative to the background of local image 952 at approximately 2 cm/s (remember that the cursor remains in the center of the display unless local image 952 is near an edge).

Conversely, the speed and/or distance a cursor on the host display 424 moves relative to the host image 950 is a function of both the speed and distance of the applied gesture as well as the level of zoom of the local image 952 relative to the host image 950. By way of example, if the local image 952 is in a zoomed-out state, a cursor on the host display 424 would move faster and farther relative to the host image 950, while in a zoomed-in state, the cursor would move relatively slower and for a shorter distance for the same applied gesture. Equation (3) above provides the relationship between the distance moved relative to the host image 950 and the distance moved relative to the local display 210 as a function of zoom. Equation (4) below provides the relationship between the speed $V_H$ moved relative to the host image 950 and the speed $V_L$ moved relative to the local display 210 as a function of zoom.

$$V_H = \frac{V_L}{z} \qquad \text{eq(4)}$$

In conclusion, it should also be noted that embodiments of the present disclosure further relate to computer storage products with a computer-readable medium that have computer code thereon for performing various computer-implemented operations. The media and computer code may be those specially designed and constructed for the purposes of the present disclosure, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

As an example and not by way of limitation, the local computing device 102 and host computer system 104 having architectures as described above may provide functionality as a result of processors 204 and 418, respectively, executing software embodied in one or more tangible, computer-readable media, such as memory 206 and 420, respectively. The software implementing various embodiments of the present disclosure may be stored in memory 206 and executed by processor 204. A computer-readable medium may include one or more memory devices, according to particular needs. Memory 206 may read the software from one or more other computer-readable media or from one or more other sources via network interface 205. The software may cause processor 204 to execute particular processes or particular steps of particular processes described herein, including defining data structures stored in memory 206 and modifying such data structures according to the processes defined by the software. In addition or as an alternative, the local computing device 102 may provide functionality as a result of logic hardwired or otherwise embodied in a circuit, which may operate in place of or together with software to execute particular processes or particular steps of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several example embodiments, there are alterations, permutations, and various substitute equivalents, which fall within the scope of this disclosure. It should also be noted that there are many alternative ways of implementing the methods and apparatuses of the present disclosure. It is therefore intended that the following appended claims be interpreted as including all such alterations, permutations, and various substitute equivalents as fall within the true spirit and scope of the present disclosure.

What is claimed:

1. An apparatus comprising:
    a display operable to display a local image defined relative to local image space coordinates;
    a touchscreen interface positioned over the display, the touchscreen interface operable to register and track one or more touch events occurring over the touchscreen interface;
    one or more processors; and
    one or more computer-readable tangible media encoding one or more instructions that, when executed collectively by the processors:
    establish a remote network computing (RNC) session with a host computer system over a network;
    transmit, to the host computer system, touch event information associated with touch events;
    receive, from the host computer system, graphical display information corresponding to a host image associated with the host computer system, the host image being defined relative to host image space coordinates, the graphical display information being received in host image space coordinates;
    translate the graphical display information from host image space coordinates to local image space coordinates;
    update the local image based on the graphical display information, the local image comprising a selected portion of the host image; and
    in response to mouse movement events caused by associated touch events, change the selected portion of the host image while keeping a cursor displayed on the display in the center of the display.

2. The apparatus of claim 1, wherein the cursor displayed on the display is kept in the center of the display except when the center of the selected portion of the host image is within a predetermined limit of an edge of the host image, thereafter the cursor is moved relative to the local display in at least one dimension.

3. The apparatus of claim 1, wherein the touchscreen interface is configured to recognize single point and multipoint gestures.

4. The apparatus of claim 1, wherein the touch event information sent to the host computer system includes graphical display coordinates associated with the touch events.

5. The apparatus of claim 4, wherein the graphical display coordinates sent to the host computer system are host image space coordinates.

6. The apparatus of claim 4, wherein the touch event information sent to the host computer system includes mouse events and corresponding graphical display coordinates associated with the touch events.

7. The apparatus of claim 1, wherein the touch event information sent to the host computer system is encrypted.

8. The apparatus of claim 1, wherein the network comprises one or more of a group consisting of: a wired network, a wireless network, a cellular network, a Bluetooth connection and an Infrared (IR) connection.

9. A method comprising:
    establishing a remote network computing (RNC) session between a local computing device and a host computer system over a network, the local computing device including
        a display operable to display a local image defined relative to local image space coordinates; and
        a touchscreen interface positioned over the display, the touchscreen interface operable to register and track one or more touch events occurring over the touchscreen interface;
    transmitting, to the host computer system, touch event information associated with touch events;
    receiving, from the host computer system, graphical display information corresponding to a host image associated with the host computer system, the host image being defined relative to host image space coordinates, the graphical display information being received in host image space coordinates;
    translating the graphical display information from host image space coordinates to local image space coordinates;

updating the local image based on the graphical display information, the local image comprising a selected portion of the host image; and in response to mouse movement events caused by associated touch events, changing the selected portion of the host image while keeping a cursor displayed on the display in the center of the display.

10. The method of claim 9, wherein the cursor displayed on the display is kept in the center of the display except when the center of the selected portion of the host image is within a predetermined limit of an edge of the host image, thereafter the method further comprising moving the cursor relative to the local display in at least one dimension.

11. The method of claim 9, wherein the touchscreen interface is configured to recognize single point and multipoint gestures.

12. The method of claim 9, wherein the touch event information sent to the host computer system includes graphical display coordinates associated with the touch events.

13. The method of claim 12, wherein the graphical display coordinates sent to the host computer system are host image space coordinates.

14. The method of claim 12, wherein the touch event information sent to the host computer system includes mouse events and corresponding graphical display coordinates associated with the touch events.

15. The method of claim 9, further comprising encrypting the touch event information sent to the host computer system.

16. The method of claim 9, wherein the network comprises one or more of a group consisting of: a wired network, a wireless network, a cellular network, a Bluetooth connection and an Infrared (IR) connection.

17. Software embodied in one or more tangible computer-readable media for execution by one or more processors, the software when executed operable to:

establish a remote network computing (RNC) session between a local computing device and a host computer system over a network, the local computing device including a display operable to display a local image defined relative to local image space coordinates; and a touchscreen interface positioned over the display, the touchscreen interface operable to register and track one or more touch events occurring over the touchscreen interface;

transmit, to the host computer system, touch event information associated with touch events;

receive, from the host computer system, graphical display information corresponding to a host image associated with the host computer system, the host image being defined relative to host image space coordinates, the graphical display information being received in host image space coordinates;

translate the graphical display information from host image space coordinates to local image space coordinates;

update the local image based on the graphical display information, the local image comprising a selected portion of the host image; and in response to mouse movement events caused by associated touch events, change the selected portion of the host image while keeping a cursor displayed on the display in the center of the display.

18. The software of claim 17, wherein the cursor displayed on the display is kept in the center of the display except when the center of the selected portion of the host image is within a predetermined limit of an edge of the host image, thereafter the software is operable to move the cursor relative to the local display in at least one dimension.

19. The software of claim 17, wherein the software is further operable to recognize single point and multipoint gestures.

20. The software of claim 17, wherein the touch event information sent to the host computer system includes graphical display coordinates associated with the touch events.

21. The software of claim 20, wherein the graphical display coordinates sent to the host computer system are host image space coordinates.

22. The software of claim 20, wherein the touch event information sent to the host computer system includes mouse events and corresponding graphical display coordinates associated with the touch events.

23. The software of claim 17, wherein the software is further operable to encrypt the touch event information sent to the host computer system.

24. The software of claim 17, wherein the network comprises one or more of a group consisting of: a wired network, a wireless network, a cellular network, a Bluetooth connection and an Infrared (IR) connection.

* * * * *